(12) United States Patent
Do et al.

(10) Patent No.: US 10,315,118 B2
(45) Date of Patent: Jun. 11, 2019

(54) IDENTIFYING AN INDIVIDUAL'S ABILITIES, SKILLS AND INTERESTS THROUGH GAMING DATA ANALYTICS

(71) Applicant: IDENTIFOR, INC., Mendham, NJ (US)

(72) Inventors: Cuong Do, Mendham, NJ (US); Wayne Scholar, Mars, PA (US)

(73) Assignee: IDENTIFOR, INC., Mendham, NJ (US)

( * ) Notice: Subject to any disclaimer, the term of this patent is extended or adjusted under 35 U.S.C. 154(b) by 0 days.

(21) Appl. No.: 15/522,570

(22) PCT Filed: Oct. 27, 2015

(86) PCT No.: PCT/US2015/057595
§ 371 (c)(1),
(2) Date: Apr. 27, 2017

(87) PCT Pub. No.: WO2016/069611
PCT Pub. Date: May 6, 2016

(65) Prior Publication Data
US 2017/0333796 A1 Nov. 23, 2017

Related U.S. Application Data

(60) Provisional application No. 62/068,966, filed on Oct. 27, 2014.

(51) Int. Cl.
*G09B 5/00* (2006.01)
*A63F 13/798* (2014.01)
(Continued)

(52) U.S. Cl.
CPC ............ *A63F 13/798* (2014.09); *A63F 13/67* (2014.09); *A63F 13/85* (2014.09); *G06F 7/02* (2013.01);
(Continued)

(58) Field of Classification Search
CPC ....................................................... G09B 5/00
See application file for complete search history.

(56) References Cited

U.S. PATENT DOCUMENTS

2004/0115597 A1 6/2004 Butt
2006/0128471 A1 6/2006 Willis et al.
(Continued)

FOREIGN PATENT DOCUMENTS

WO   WO 00/11571 A1    3/2000
WO   WO/2013/168154 A1  11/2013

OTHER PUBLICATIONS

Search Report from EP Application No. 15854153.2; dated Jul. 4, 2017.
(Continued)

*Primary Examiner* — Omkar A Deodhar
(74) *Attorney, Agent, or Firm* — BakerHostetler

(57) ABSTRACT

Personal characteristic may be identified by receiving, at a server, game data indicative of a plurality of games, determining a first comparative game performance associated with a first game of the plurality of games, deriving a personal character from the first comparative game performance, and providing an indication of the personal characteristic. Each game of the plurality of games is designed to assess at least one personal characteristic. The personal characteristics may comprise abilities, skills, and/or interests. The first comparative game performance is determined, for example, based on the game data and comparative game information that is indicative of a comparison between game performance associated with the first game and respective game performance associated with at least one other game of the plurality of games.

16 Claims, 48 Drawing Sheets

(51) Int. Cl.
  *G06Q 10/10* (2012.01)
  *G09B 5/06* (2006.01)
  *A63F 13/67* (2014.01)
  *A63F 13/85* (2014.01)
  *G06F 7/02* (2006.01)
  *G09B 19/00* (2006.01)
  *G09B 19/02* (2006.01)

(52) U.S. Cl.
  CPC ........... *G06Q 10/1053* (2013.01); *G09B 5/06* (2013.01); *G09B 19/00* (2013.01); *G09B 19/025* (2013.01); *A63F 2300/8064* (2013.01)

(56) References Cited

U.S. PATENT DOCUMENTS

| | | |
|---|---|---|
| 2009/0204906 A1 | 8/2009 | Irving |
| 2012/0179485 A1 | 7/2012 | Saneii |
| 2012/0295718 A1 | 11/2012 | Paquet et al. |
| 2012/0330869 A1 | 12/2012 | Durham |

OTHER PUBLICATIONS

International Search Report from PCT/US2015/057595; dated Jan. 12, 2016.

FIND THE SUSPECT
YOU ARE APPOINTED BY THE DETECTIVE TO RECOGNIZE THE SUSPECTS WHO ARE INVOLVED IN A SERIOUS CRIME. SELECT THE IMAGE OF THE COVERED SUSPECT. BE CAREFUL TO CHOOSE THE RIGHT CRIMINALS!

PLAY NOW

MEMORY
UNLEASH THE POWER OF YOUR ACTIVE MEMORY THROUGH TRADITIONAL TRICKS! YOUR TASK IN THIS GAME IS TO REMEMBER THE OBJECTS SHOWN ON THE CARDS AND FIND THEIR CORRESPONDING MATCHES. FINISH THE GAME WITH AS FEW MOVES AS POSSIBLE TO ROCKET UP THE LEADERBOARD!

PLAY NOW

*FIG. 11*
*(CONT'D)*

JOB INTERESTS

YOUR CHILD IS ON ROUND 0 OF THE JOB INTERESTS GAME. YOU ARE VIEWING RESULTS BASED UPON YOUR CHILD'S PROGRESS IN THE GAME. IF ALL 30 ROUNDS HAVE BEEN COMPLETED, THE FINAL RESULTS ARE DISPLAYED. THE JOB INTERESTS GAME IS PRESENTED PRIOR TO BEGINNING ANY OF OUR LISTED GAMES.

ENTERPRISING                CONVENTIONAL
SOCIAL                      INVESTIGATIVE
REALISTIC                   ARTISTIC

SUGGESTED CAREERS

CAREER              PREPARATION NEEDED

COMPUTER PROGRAMMER   ☆ ☆

CREATE, MODIFY, AND TEST THE CODE, FORMS AND SCRIPT THAT ALLOW COMPUTER APPLICATIONS TO RUN. WORKS FROM SPECIFICATIONS DRAWN UP BY SOFTWARE DEVELOPERS OR OTHER INDIVIDUALS. MAY ASSIST SOFTWARE DEVELOPERS BY ANALYZING USER NEEDS AND DESIGNING SOFTWARE

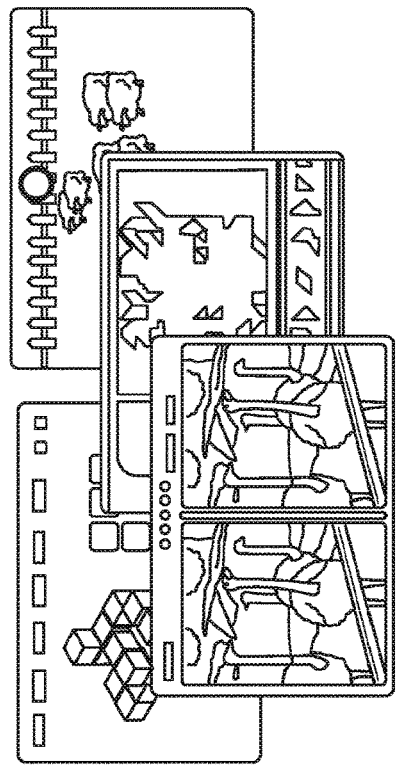
SPATIAL PROCESSING: SPOT THE DIFFERENCE, SHAPE INLAY, COUNT THE CUBES, COUNT THE SHEEP
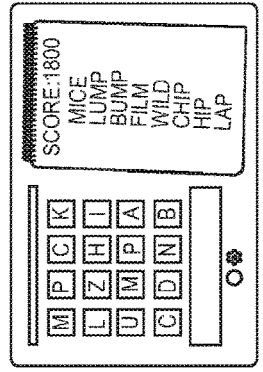
LINGUISTICS: WORD SEARCH
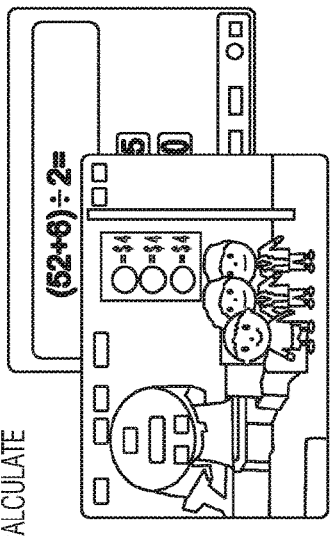
MATH: BUS DRIVER MATH, QUICK CALCULATE
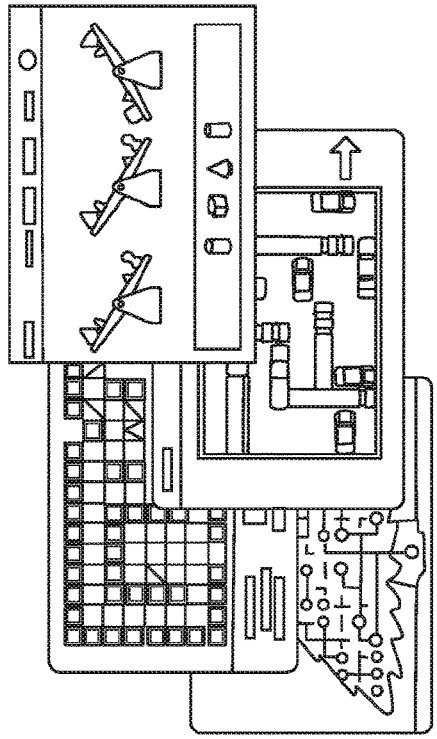
LOGIC: PARKING LOT, SEESAW LOGIC, RAINBOW MECHANIC, CHRISTMAS TREE LIGHT-UP
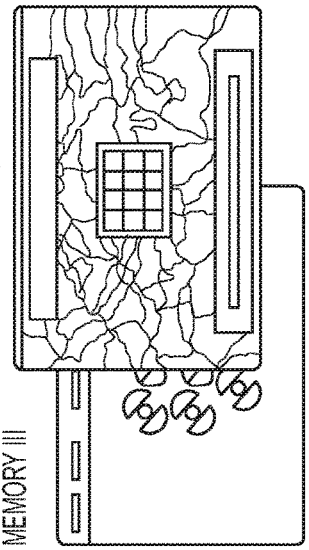
VISUAL MEMORY: PATTERN MEMORY, MEMORY II
FIG. 20

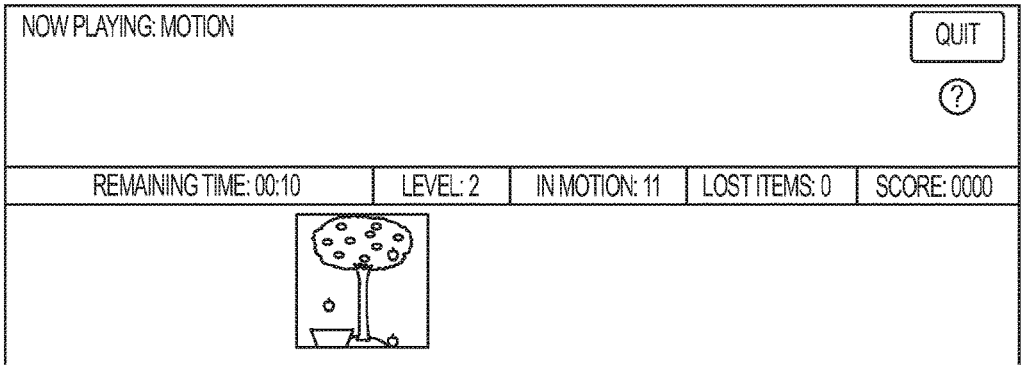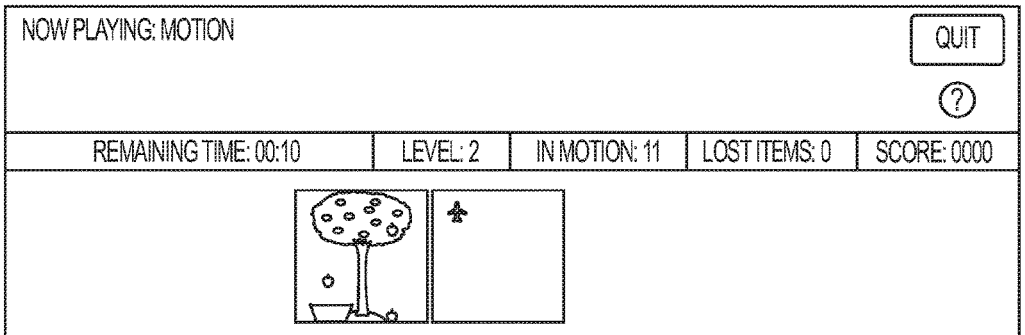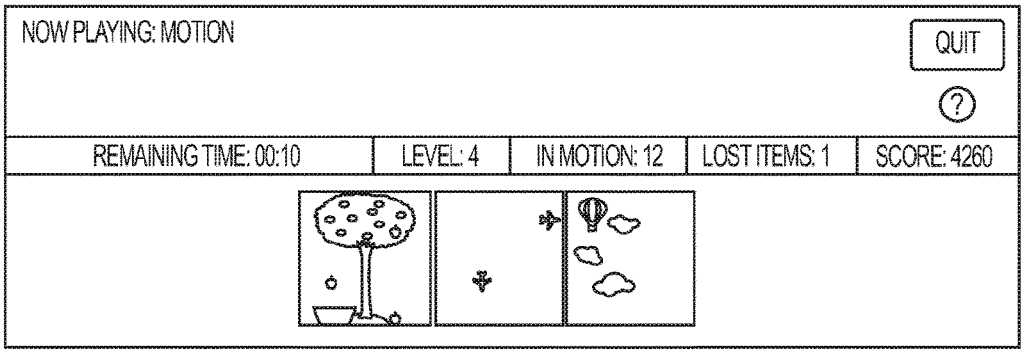
FIG. 21B

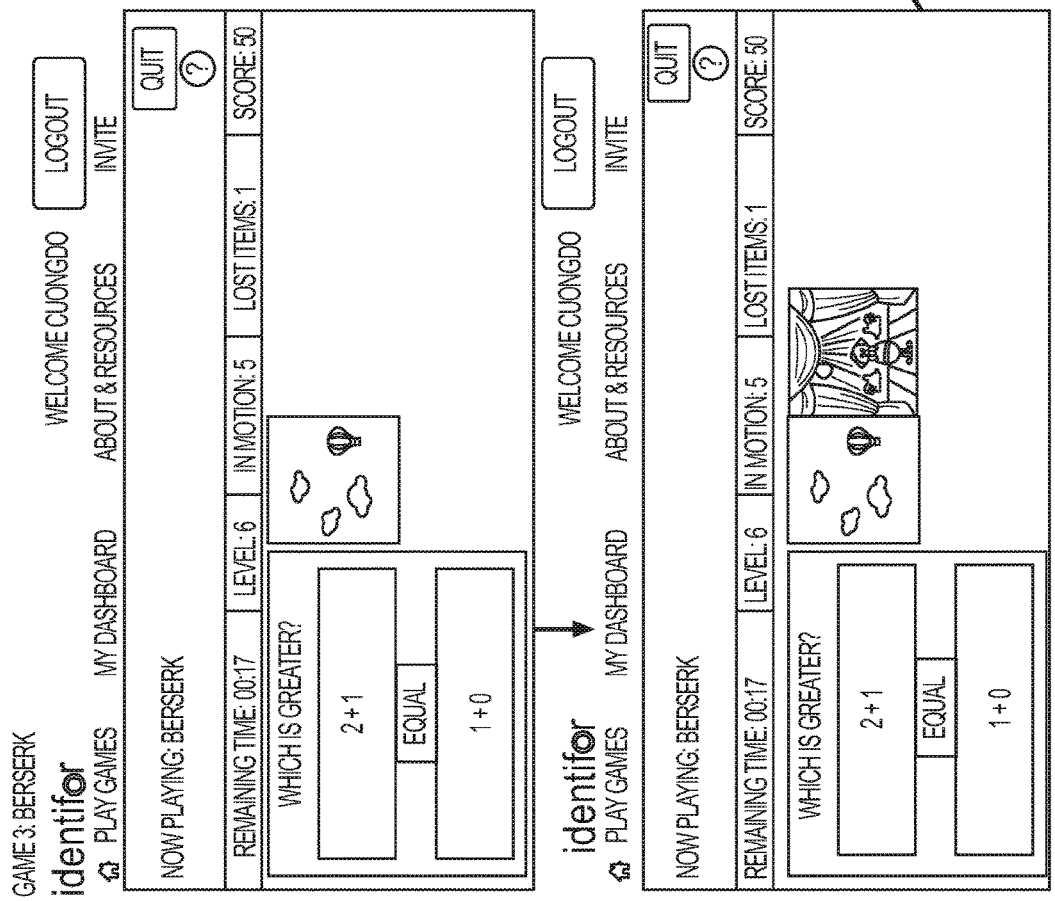

WHICH OF THE FOLLOWING CHOICES COULD COME NEXT? KEEP IN MIND THE STYLE AND AUDIENCE. SELECT OR SAY YOUR ANSWER.

2. PROVIDE ALTERNATIVE MODES FOR:
   a. VIEWING/ HEARING POTENTIAL ANSWERS
   b. PROVIDING ANSWERS (SELECT OR SPEAK)

A. THERE'S SIMPLY NO WAY TO REALLY MAKE A LOT OF MONEY THIS WAY, THOUGH. LET'S FACE IT. A COMPANY THAT'S NOT PROFITABLE IS NOT GOING TO SURVIVE.

B. WHILE THESE COMPANIES ARE DOING THEIR BEST TO CAPITALIZE ON PEOPLE'S CURIOSITY, THE HIGH COST OF THE TESTING AND ANALYSIS PREVENT THEM FROM EXPANDING INTO THE BROADER MARKET.

C. THESE COMPANIES AREN'T MAKING THE GRADE BECAUSE THEY ARE KNOCKING ON ONLY A FEW DOORS: MOST FOLKS CAN'T AFFORD THE PRICEY $200 OR MORE FOR SOME STRANGER TO LOOK AT THEIR BLOOD.

D. SINCE THESE COMPANIES ARE TARGETING A SMALL ENCLAVE, THEY MISS OUT ON THE POTENTIAL END-USERS WHO MAY EXPRESS AN INTEREST IN THE NONCOMMERCIAL COMMUNITY.

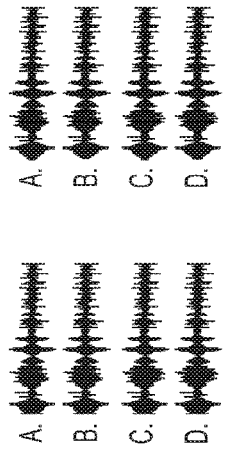

A.
B.
C.
D.

A.
B.
C.
D.

A. THERE'S SIMPLY NO WAY TO REALLY MAKE A LOT OF MONEY THIS WAY, THOUGH. LET'S FACE IT. A COMPANY THAT'S NOT PROFITABLE IS NOT GOING TO SURVIVE.

B. WHILE THESE COMPANIES ARE DOING THEIR BEST TO CAPITALIZE ON PEOPLE'S CURIOSITY, THE HIGH COST OF THE TESTING AND ANALYSIS PREVENT THEM

*FIG. 25B*

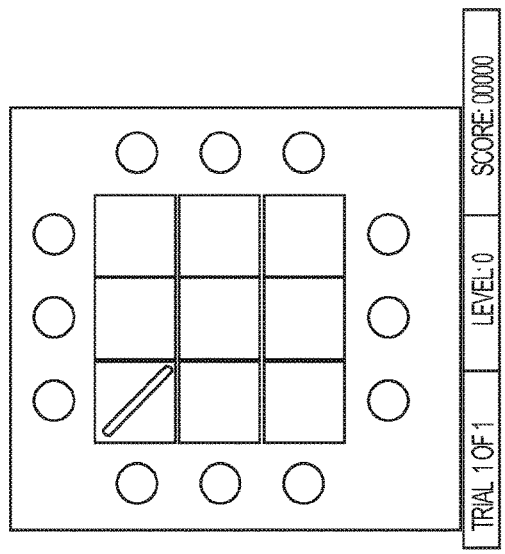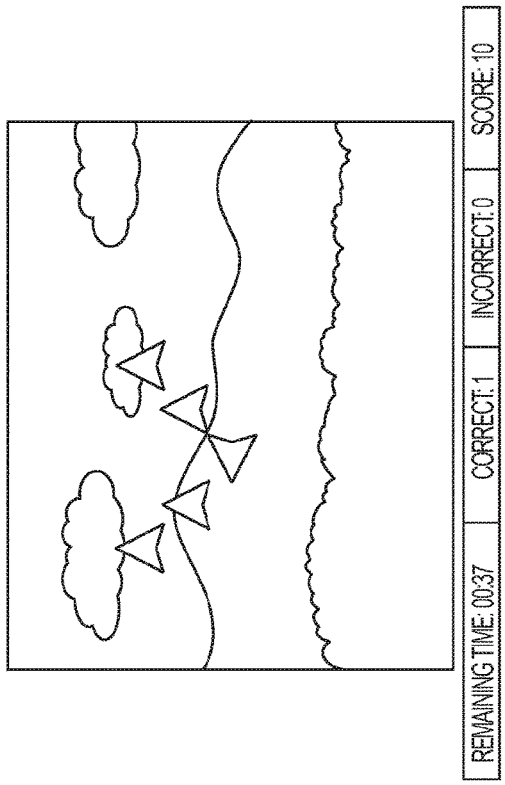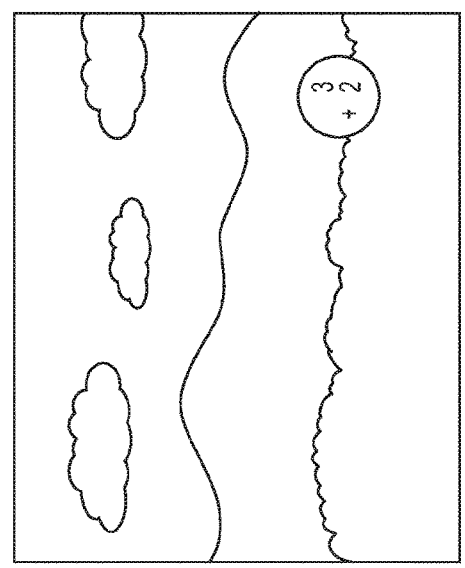
FIG. 26

*FIG. 30*

| LINGUISTIC | LOGICAL-MATHEMATICAL | SPATIAL |
|---|---|---|
| LINGUISTIC GIFTED CHILDREN HAVE HIGHLY DEVELOPED AUDITORY SKILLS AND ENJOY PLAYING AROUND WITH THE SOUNDS OF LANGUAGE. THEY OFTEN THINK IN WORDS.<br>• LIKES TO WRITE CREATIVELY<br>• SPINS TALL TALES OR TELL JOKES AND STORIES<br>• HAS A GOOD MEMORY FOR NAMES, PLACES, DATES, OR TRIVIA<br>• ENJOYS READING BOOKS FOR PLEASURE<br>• SPELLS WORDS ACCURATELY | YOUNGSTERS WHO THINK NUMERICALLY OR IN TERMS OF LOGICAL PATTERNS AND SEQUENCES, OR OTHER FORMS OF LOGICAL REASONING.<br>• LIKE TO EXPLORE PATTERNS, CATEGORIES, AND RELATIONSHIPS<br>• CAPABLE OF HIGHLY ABSTRACT FORMS OF LOGICAL THINKING<br>• LOVE BRAIN TEASERS, LOGICAL PUZZLES, AND GAMES THAT REQUIRE REASONING ABILITIES (e.g., CHESS) | THESE KIDS KNOW WHERE EVERYTHING IS LOCATED IN THE HOUSE. THEY THINK IN IMAGES AND PICTURES. THEY'RE THE ONES WHO FIND THINGS THAT HAVE BEEN LOST OR MISPLACED.<br>• LOVE MAZES OR JIGSAW PUZZLES<br>• SPEND FREE TIME DRAWING,<br>• DESIGNING & BUILDING THINGS<br>• FASCINATED WITH MACHINES AND CONTRAPTIONS; INVENT THINGS<br>• EXCELS IN ART CLASS<br>• THINK IN VISUAL IMAGES<br>• EASILY READS MAPS, CHARTS, AND DIAGRAMS |
| MUSICAL | INTERPERSONAL | INTRAPERSONAL |
| THESE KIDS OFTEN SING, HUM, OR WHISTLE TUNES QUIETLY TO THEMSELVES. THEY QUICKLY RECOGNIZE MUSIC.<br>• PLAYS MUSICAL INSTRUMENTS<br>• REMEMBERS MELODIES OF SONGS<br>• STUDIES BETTER WHEN BACKGROUND MUSIC IS PLAYING<br>• SINGS TO HERSELF OR TO OTHERS<br>• IS SENSITIVE TO ENVIRONMENTAL NOISES<br>• RESPONDS STRONGLY TO DIFFICULT KINDS OF MUSIC | THESE CHILDREN UNDERSTAND PEOPLE. THEY ARE FREQUENTLY LEADERS AMONG THEIR PEERS. THEY ORGANIZE, COMMUNICATE, AND AT THEIR WORST, MANIPULATE. THEY MAY KNOW WHAT'S GOING ON WITH EVERYBODY.<br>• HAS A LOT OF FRIENDS<br>• SOCIALIZES A GREAT DEAL<br>• APPEARS TO BE "STREET SMART"<br>• ENJOYS PLAYING GROUP GAMES<br>• HAS A LOT OF EMPATHY FOR OTHERS<br>• IS SOUGHT OUT AS AN "ADVISER" OR "PROBLEM-SOLVER" BY PEERS | THESE CHILDREN KNOW WHO THEY ARE AND WHAT THEY ARE CAPABLE OF ACCOMPLISHING. THEY ARE OFTEN GOOD AT SETTING GOALS FOR THEMSELVES, AND, EVEN IF THEY DON'T REACH THOSE GOALS, THEY'RE GOOD AT CREATING NEW ONES THAT ARE MORE REALISTIC.<br>• DISPLAYS A SENSE OF INDEPENDENCE OR A STRONG WILL<br>• HAS A REALISTIC SENSE OF HER STRENGTHS AND WEAKNESSES<br>• WORKS OR STUDIES WELL ALONE<br>• HAS A SENSE OF SELF-CONFIDENCE<br>• MARCHES TO A DIFFERENT DRUMMER |

FIG. 30 *(CON'T)*

| BODILY-KINESTHETIC |
|---|
| THESE CHILDREN PROCESS KNOWLEDGE THROUGH BODILY SENSATIONS<br>• MOVES, TWITCHES, TAPS, OR FIDGETS WHILE SITTING IN A CHAIR<br>• ENGAGES IN PHYSICAL ACTIVITIES (e.g., SWIMMING, BIKING, DANCING, ACTING, ETC.)<br>• NEEDS TO TOUCH THINGS IN ORDER TO LEARN MORE ABOUT THEM<br>• DEMONSTRATES SKILL IN A CRAFT LIKE WOODWORKING, SEWING, CARVING, OR SCULPTURE<br>• LOVES TO TAKE THINGS APART AND PUT THEM BACK TOGETHER AGAIN |
| NATURALIST |
| THESE KIDS ARE NATURE LOVERS. THEY WOULD RATHER BE IN THE FIELDS OR COLLECTING ROCKS THAN BE DOING THEIR PAPER AND PENCIL HOMEWORK. HOWEVER, IF THEIR SCHOOLWORK INVOLVES STUDYING LIZARDS, DINOSAURS, STARS, OR OTHER LIVING SYSTEMS, THEN THEIR MOTIVATION IS LIKELY TO SOAR.<br>• RELATES WELL TO PETS<br>• ENJOYS WALKS IN NATURE OR TO THE ZOO OR NATURAL HISTORY MUSEUM<br>• SHOWS SENSITIVITY TO NATURAL FORMATIONS<br>• LOVES TO GARDEN OR BE AROUND GARDENS |

*JOHN H. AND ELISABETH A. HOBBS PROFESSOR OF COGNITION AND EDUCATION, HARVARD GRADUATE SCHOOL OF EDUCATION

FIG. 33

① READ EACH STATEMENT. IF YOU AGREE WITH THE STATEMENT, FILL IN THE CIRCLE. THERE ARE NO WRONG ANSWERS!

| | R | I | A | S | E | C |
|---|---|---|---|---|---|---|
| 1. I LIKE TO WORK ON CARS | O | | | | | |
| 2. I LIKE TO DO PUZZLES | | O | | | | |
| 3. I AM GOOD AT WORKING INDEPENDENTLY | | | | | | O |
| 4. I LIKE TO WORK IN TEAMS | | | | O | | |
| 5. I AM AN AMBITIOUS PERSON, I SET GOALS FOR MYSELF | | | | | O | |
| 6. I LIKE TO ORGANIZE THINGS, FILES, DESKS, OFFICES | | | | | | O |
| 7. I LIKE TO BUILD THINGS | O | | | | | |
| 8. I LIKE TO READ ABOUT ART AND MUSIC | | | O | | | |
| 9. I LIKE TO HAVE CLEAR INSTRUCTIONS TO FOLLOW | | | | | | O |
| 10. I LIKE TO TRY TO INFLUENCE OR PERSUADE PEOPLE | | | | | O | |
| 11. I LIKE TO DO EXPERIMENTS | | O | | | | |
| 12. I LIKE TO TEACH OR TRAIN PEOPLE | | | | O | | |
| 13. I LIKE TRYING TO HELP PEOPLE SOLVE THEIR PROBLEMS | | | | O | | |
| 14. I LIKE TO TAKE CARE OF ANIMALS | O | | | | | |
| 15. I WOULDN'T MIND WORKING 8 HOURS PER DAY IN AN OFFICE | | | | | | O |
| 16. I LIKE SELLING THINGS | | | | | O | |
| 17. I ENJOY CREATIVE WRITING | | | O | | | |
| 18. I ENJOY SCIENCE | | O | | | | |
| 19. I AM QUICK TO TAKE ON NEW RESPONSIBILITIES | | | | | O | |
| 20. I AM INTERESTED IN HEALING PEOPLE | | | | O | | |
| 21. I ENJOY TRYING TO FIGURE OUT HOW THINGS WORK | | O | | | | |

| | R | I | A | S | E | C |
|---|---|---|---|---|---|---|
| 22. I LIKE PUTTING THINGS TOGETHER OR ASSEMBLING THINGS | O | | | | | |
| 23. I AM A CREATIVE PERSON | | | O | | | |
| 24. I PAY ATTENTION TO DETAILS | | | | | | O |
| 25. I LIKE TO DO FILING OR TYPING | | | | | | O |
| 26. I LIKE TO ANALYZE THINGS (PATTERNS/SITUATIONS) | | O | | | | |
| 27. I LIKE TO PLAY INSTRUMENTS OR SING | | | O | | | |
| 28. ENJOY LEARNING ABOUT OTHER CULTURES | | | | O | | |
| 29. I WOULD LIKE TO START MY OWN BUSINESS | | | | | O | |
| 30. I LIKE TO COOK | O | | | | | |
| 31. LIKE ACTING IN PLAYS | | | O | | | |
| 32. I AM A PRACTICAL PERSON | O | | | | | |
| 33. I LIKE WORKING WITH NUMBERS OR CHARTS | | O | | | | |
| 34. I LIKE TO GET INTO DISCUSSIONS ABOUT ISSUES | | | | O | | |
| 35. I AM GOOD AT KEEPING RECORDS OF MY WORK | | | | | | O |
| 36. I LIKE TO LEAD | | | | | O | |
| 37. I LIKE WORKING OUTDOORS | O | | | | | |
| 38. I WOULD LIKE TO WORK IN AN OFFICE | | | | | | O |
| 39. I'M GOOD AT MATH | | O | | | | |
| 40. I LIKE HELPING PEOPLE | | | | O | | |
| 41. I LIKE TO DRAW | | | O | | | |
| 42. I LIKE TO GIVE SPEECHES | | | | | O | |

TOTAL _____

GRAND TOTAL

| R | I | A | S | E | C |
|---|---|---|---|---|---|
| | | | | | |

② ADD UP THE NUMBER OF FILLED IN CIRCLES IN EACH COLUMN
  AND THEN ADD THE TWO COLUMNS TOGETHER FOR A GRAND TOTAL

③ USING YOUR GRAND TOTAL SCORES FROM ABOVE, TRANSFER THE
  CIRCLES FOR EACH LETTER INTO THE APPROPRIATE COLUMN BELOW

R = REALISTIC        TOTAL _____
I = INVESTIGATIVE    TOTAL _____
A = ARTISTIC         TOTAL _____
S = SOCIAL           TOTAL _____
E = ENTERPRISING     TOTAL _____
C = CONVENTIONAL     TOTAL _____

④ TAKE THE THREE LETTERS WITH THE HIGHEST SCORES AND
  RECORD THEM UNDER "MY INTEREST CODE"

MY INTEREST CODE _____

⑤ TURN PAGE TO
  SEE WHAT THIS
  MEANS!

FIG. 33
*(CONT'D)1*

*JOHN HOLLAND WAS PROFESSOR EMERITUS OF SOCIOLOGY AT JOHNS HOPKINS UNIVERSITY. HE DIED IN 2008 AT THE AGE OF 89

FIG. 33 (CONT'D) 2

R=REALISTIC
THESE PEOPLE ARE OFTEN GOOD AT MECHANICAL OR ATHLETIC JOBS. GOOD COLLEGE MAJORS FOR REALISTIC PEOPLE ARE...
- AGRICULTURE
- HEALTH ASSISTANT
- COMPUTERS
- CONSTRUCTION
- MECHANIC/MACHINIST
- ENGINEERING
- FOOD AND HOSPITALITY

RELATED PATHWAYS
NATURAL RESOURCES
HEALTH SERVICES
INDUSTRIAL AND ENGINEERING TECHNOLOGY
ARTS AND COMMUNICATION

S=SOCIAL
THESE PEOPLE LIKE TO WORK WITH OTHER PEOPLE RATHER THAN THINGS. GOOD COLLEGE MAJORS FOR SOCIAL PEOPLE ARE...
- COUNSELING
- NURSING
- PHYSICAL THERAPY
- TRAVEL
- ADVERTISING
- PUBLIC RELATIONS
- EDUCATION

RELATED PATHWAYS
HEALTH SERVICES
PUBLIC AND HUMAN SERVICES

I=INVESTIGATIVE
THESE PEOPLE LIKE TO WATCH, LEARN, ANALYZE, AND SOLVE PROBLEMS. GOOD COLLEGE MAJORS FOR INVESTIGATIVE PEOPLE ARE...
- MARINE BIOLOGY
- ENGINEERING
- CHEMISTRY
- ZOOLOGY
- MEDICAL/SURGERY
- CONSUMER ECONOMICS
- PSYCHOLOGY

RELATED PATHWAYS
HEALTH SERVICES
BUSINESS
PUBLIC AND HUMAN SERVICES
INDUSTRIAL AND ENGINEERING TECHNOLOGY

E=ENTERPRISING
THESE PEOPLE LIKE TO WORK WITH OTHERS AND ENJOY PERSUADING AND PERFORMING. GOOD COLLEGE MAJORS FOR ENTERPRISING PEOPLE ARE...
- FASHION MERCHANDISING
- REAL ESTATE
- MARKETING/SALES
- LAW
- POLITICAL SCIENCE
- INTERNATIONAL TRADE
- BANKING/FINANCE

RELATED PATHWAYS
BUSINESS
PUBLIC AND HUMAN SERVICES
ARTS AND COMMUNICATION

A=ARTISTIC
THESE PEOPLE LIKE TO WORK IN UNSTRUCTURED SITUATIONS WHERE THEY CAN USE THEIR CREATIVITY. GOOD MAJORS FOR ARTISTIC PEOPLE ARE...
- COMMUNICATIONS
- COSMETOLOGY
- FINE AND PERFORMING ARTS
- PHOTOGRAPHY
- RADIO AND TV
- INTERIOR DESIGN
- ARCHITECTURE

RELATED PATHWAYS
PUBLIC AND HUMAN SERVICES
ARTS AND COMMUNICATION

C=CONVENTIONAL
THESE PEOPLE ARE VERY VERY DETAIL ORIENTED, ORGANIZED AND LIKE TO WORK WITH DATA. GOOD COLLEGE MAJORS FOR CONVENTIONAL PEOPLE ARE...
- ACCOUNTING
- COURT REPORTING
- INSURANCE
- ADMINISTRATION
- MEDICAL RECORDS
- BANKING
- DATA PROCESSING

RELATED PATHWAYS
HEALTH SERVICES
BUSINESS
INDUSTRIAL AND ENGINEERING TECHNOLOGY

IDENTIFYING AN INDIVIDUAL'S ABILITIES, SKILLS AND INTERESTS THROUGH GAMING DATA ANALYTICS

CROSS REFERENCE TO RELATED APPLICATIONS

This application is a National Stage of International Patent Application No. PCT/US2015/057595, filed Oct. 27, 2015, and claims priority to U.S. Patent Application No. 62/068,966 filed Oct. 27, 2014, the contents of which are incorporated by reference herein in their entirety.

BACKGROUND

Grades, standardized test scores, years of extracurricular activities, and dinner conversations at home help guide many children and their families in the transition to adulthood. These most basic guideposts, however, often are unreliable or missing altogether for parents of autistic children or those with special needs. The absence of these critical tools often lead to less than ideal postsecondary educational/vocational pursuits, under- or unemployment, and housing and transportation challenges later in life.

SUMMARY

Systems, methods, and instrumentalities are disclosed to identify an individual's abilities, skills and interests by analyzing how people make decisions and reacts while playing games. For example, a server receives game data indicative of a plurality of games that are designed to assess at least one personal characteristic. The at least one personal characteristic may include at least one of human abilities, cognitive skills, or career interests. Upon receiving the game data, the server may determine a first comparative game performance associated with a first game of the plurality of games. The first comparative game performance is determined, for example, based on the game data and comparative game information. The comparative game information is indicative of a comparison between game performance associated with the first game and respective game performance associated with at least one other game of the plurality of games. Upon determining the first comparative game performance, the server may derive a personal character from the first comparative game performance and provide an indication of the personal characteristic.

By using games and technology, systems and method for identifying an individual's abilities, skills and interests may provide a directional sense of an individual's cognitive, social, and communicative strengths and weaknesses in a way that might previously have only been found by "accident."

The identification of an individual's abilities, skills and interests presented herein can build on three time tested frameworks: Howard Gardner's Multiple Intelligences; George McCloskey's work on Executive Functions (EFs); and John Holland's work on career interests. Howard Gardner's Multiple Intelligences work outlines the comprehensive set of human abilities. George McCloskey's work on Executive Functions (EFs) describes the set of cognitive skills that work together to help a person learn and "produce" outputs and achieve goals. John Holland's work on career interests helps people explore careers based on how they like to spend their time.

A set of games can be provided for children and adults who love to play. The games themselves can be designed to collect data on how the player reacts, answers questions, makes decisions, etc. The more games are played by a person, the more information about their abilities and executive function skills can be gathered.

The games can be complemented with observations provided by parents (and educators, therapists, etc. invited by the parents) to compile a 360° view of an individual. For example, parents/professionals can complete the McCloskey Executive Function Survey (MEFS) and Autism Speaks' Community-based Skills Assessment (CSA) to provide additional information on an individual. This integration of observations from the people who work most closely with the individual with the data from the games can provide valuable insights into areas of agreement and possible disconnects. This may serve to highlight areas of strengths and developmental needs for an individual.

All the data from games and surveys can be analyzed and displayed on "dashboards" and reports on individual's Gardner intelligences, EFs, and career interests. By combining an understanding of an individual's ability with an understanding of their personal interests and ambitions in the reports, an individual's strengths and interests can be displayed to support the exploration of fulfilling educational and vocational options for each individual. Parents can choose to share these reports with other professionals and educators working with the child.

An artificial intelligence platform can be used to identify each individual's abilities, skills, or interests. The artificial intelligence platform can be a human avatar to interact with users. The human avatar can make use of speech recognition and conversational context. The artificial intelligence can guide players through website and games, answer questions, and present the results to players and parents in an intuitive and easy-to-understand manner. The artificial intelligence can be trained to ask questions the way an expert psychologist working with individual clients engages in conversation to build EF skills.

An individual's abilities, skills and interests can be identified by analyzing the data of how individuals make decisions and react while playing games. The results from these analyses may offer parents some directional sense of where to explore further to build on areas of strengths and decide on a course of action for areas of weakness. Over time, the artificial intelligence platform can be "trained" to hold one-on-one conversations the way a psychologist converses with clients to build EF skills. Based on the results, individuals and families can identify abilities, skills and interests for the pursuit of fulfilling futures for each individual.

BRIEF DESCRIPTION OF THE DRAWINGS

The following detailed description of examples is better understood when read in conjunction with the appended drawings. For the purpose of illustration, there is shown in the drawings exemplary embodiments; however, the subject matter is not limited to the specific elements and instrumentalities disclosed. In the drawings:

FIG. 20 illustrates examples of repurposed games according to an embodiment.

FIG. 21B illustrates another example of a custom game to collect detailed data according to an embodiment.

FIG. 26 illustrates other examples of custom games to collect detailed data according to an embodiment.

FIG. 30 is a description of Howard Gardner's work for understanding abilities.

FIG. 33 is a description of Holland's work for understanding interests.

DETAILED DESCRIPTION

Figure 1:
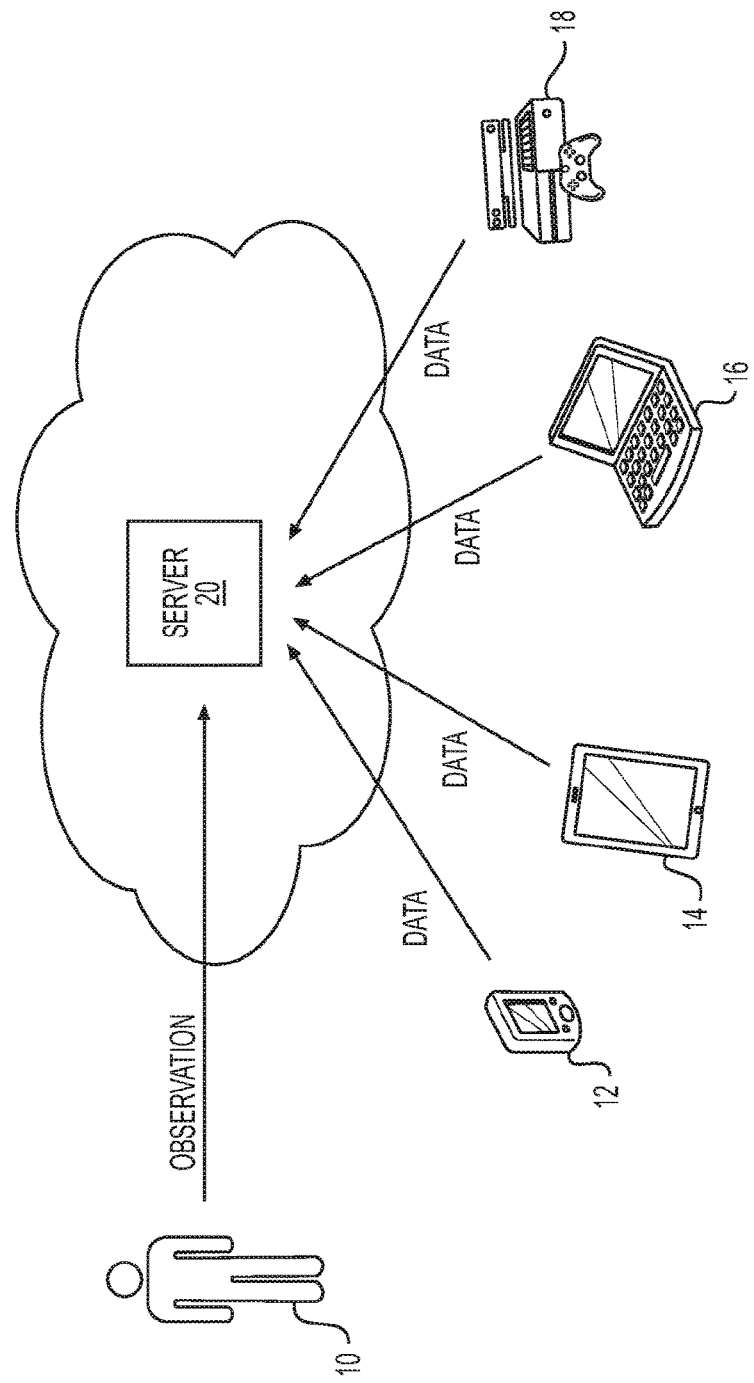
FIG. 1 is a system diagram illustrating an overview of example system for identifying an individual's abilities, skills and interests according to an embodiment.

Autism is one of the biggest childhood epidemics of our time, and up to 1 million individuals on the autism spectrum will transition to adulthood in the coming decade. Specifically, 1 in 68 children (1 in 42 boys) identified with autism spectrum disorder (CDC, May 2014) and the rate is higher than all non-routine childhood diseases (e.g., juvenile diabetes, children cancers, etc.) combined. It is expected that up to 1 million autistic teenagers will become adults in the US between now and 2030. Moreover, approximately 65% to 80% of autistic adults currently unemployed in the US. Those who are employed work fewer hours and earn less than adults with other disabilities. Many autistic adults do not have independent housing and require parental support.

The London School of Economics reports that autism is the costliest condition in the UK, costing more than heart disease, cancer, and strokes combined. In the US, in 2010 there were one million members of the population with ASD, with 80% of those being people under 19 years of age. The total is expected to grow to 1.7 million by 2020, 2.7 million in 2030, and 5.8 million by 2050. In 2010, in the US cost an estimated 0.2% of GDP, and is expected to grow to 0.3% by 2020, 0.5% by 2030, and 0.7% by 2050.

Thus, unless new tools are created to help these individuals pursue productive lives, they will likely be a drain on society for decades to come.

Parents of typical children may have school grades, standardized test scores, years of extracurricular activities and dinner conversations to help guide the transition to adulthood. School grades and standardized test scores, for example, SAT, ACT, professional interest batteries, etc., may help parent assess their children's ability on dimensions of interest to schools and colleges. Years of extracurricular activities such as dance and sports and dinner conversations may be used as a gauge of interest and ability in area not assessed by pen-and-pencil.

However, these most basic guideposts often are unreliable or missing altogether for parents of autistic children. Autistic teenagers may not do well with grades and test scores. Autistic teenagers may not communicate well. They may have strengths in areas not assessed through traditional means that remain hidden through lack of vehicle for expression. Thus the critical tool for planning is missing for many autistic families, leading to less than ideal post-secondary educational/vocational pursuits, under-employment/unemployment, and housing & transportation challenges later in life.

In an embodiment, the systems and methods of identifying an individual's abilities, skills and interests can provide a directional understanding of their autistic child's underlying abilities, executive function skills, and interests. Understanding abilities and interests can be the first step in helping a child pursue post-secondary educational/vocational plans. Specifically, it may help parents identify where their children reach current limits ("hit the wall") on a host of abilities and skills, especially those not traditionally assessed by schools and standardized tests. Moreover, it may help the children build skills where research has shown possible, especially with "Executive Function".

In an embodiment, the systems and methods of identifying an individual's abilities, skills and interests may use 3 time-tested frameworks to identify the characteristics. The 3 time-tested frameworks may include: Howard Gardner's Multiple Intelligences work; Executive Function; and John Holland's work on career interests.

Howard Gardner's Multiple Intelligences work outlines the comprehensive set of human abilities. Abilities assessed by traditional tests are linguistic, logic, and mathematics. Other abilities missed by traditional assessment tools are spatial, bodily, kinesthetic, musical, interpersonal, and intrapersonal.

Multiple Intelligences is a theory of intelligence that differentiates it into specific (primarily sensory) "modalities", rather than seeing intelligence as dominated by a single general ability. Psychologists historically believed that intelligence can be measured and represented by a single factor such as an IQ score. Multiple Intelligences is a different concept advanced by Professor Howard Gardner from the Harvard Graduate School of Education over 30 years ago. Multiple Intelligence suggests that there is not a single intelligence, but 8 different intelligences: 1) Verbal-linguistics; 2) Logical-mathematical; 3) Visual-spatial; 4) Musical; 5) Bodily-kinesthetic; 6) Interpersonal; 7) Intrapersonal; and 8) Naturalistic. Professor Gardner believes that each individual possesses a unique blend of all 8 intelligences. Those 8 intelligences are further described in FIG. 30.

Executive Function describes the set of cognitive skills that work together to help a person learn and "produce" of outputs and achieve goals. Among others, these skills may include "Self Regulation" functions governing a person's ability to pay attention, engage, remember, ask questions, and use efficiency and optimization to develop solutions, "Self-Realization" and "Self-Determination" functions that enables a person to effectively interact with others and create own long-term plans and goals. When executive function skills break down, behavior becomes poorly controlled thereby limiting the person's ability to go to school or work.

Figure 31:
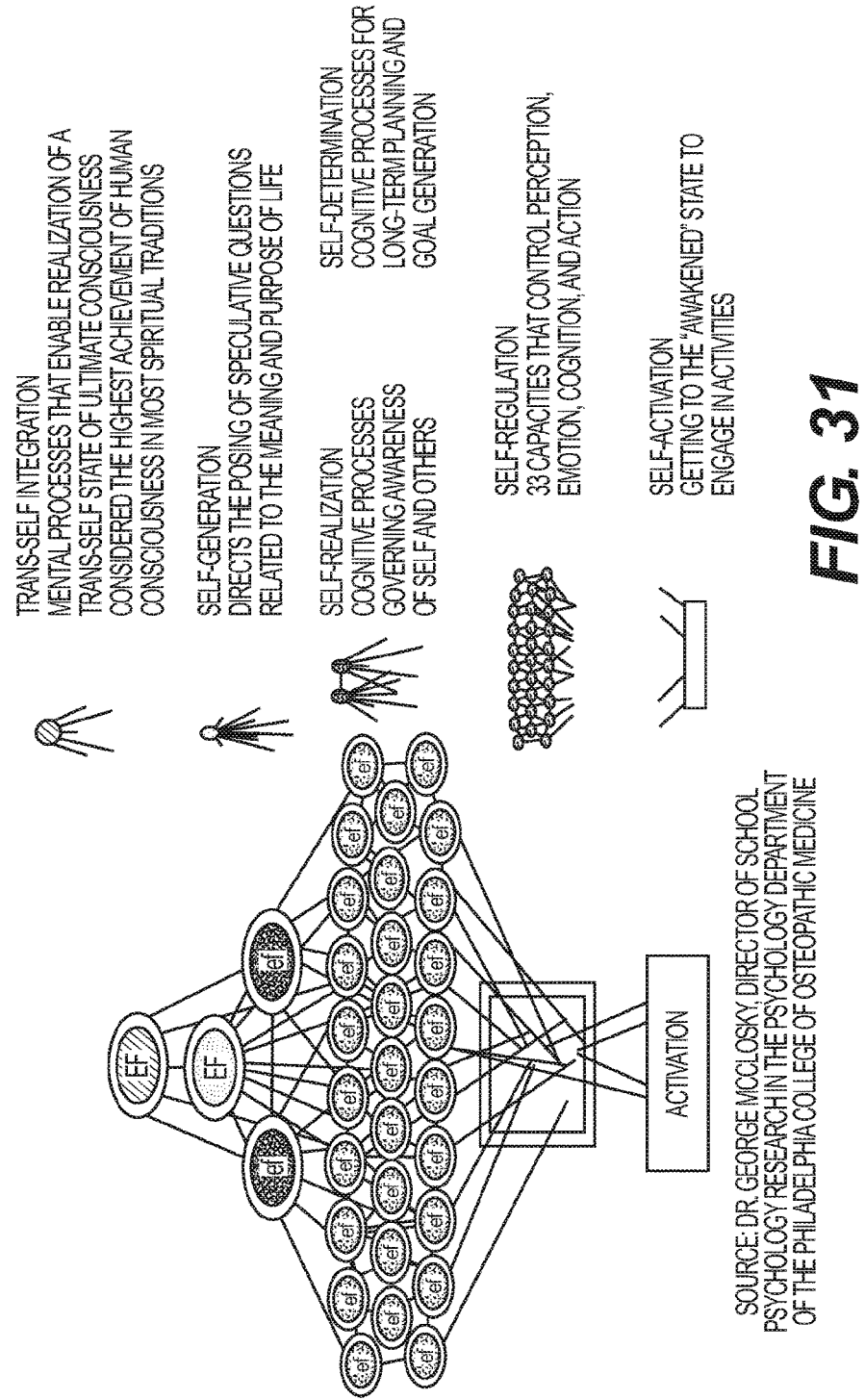
FIG. 31 is a description of Executive Functions for understanding cognitive skills.
Figure 32:
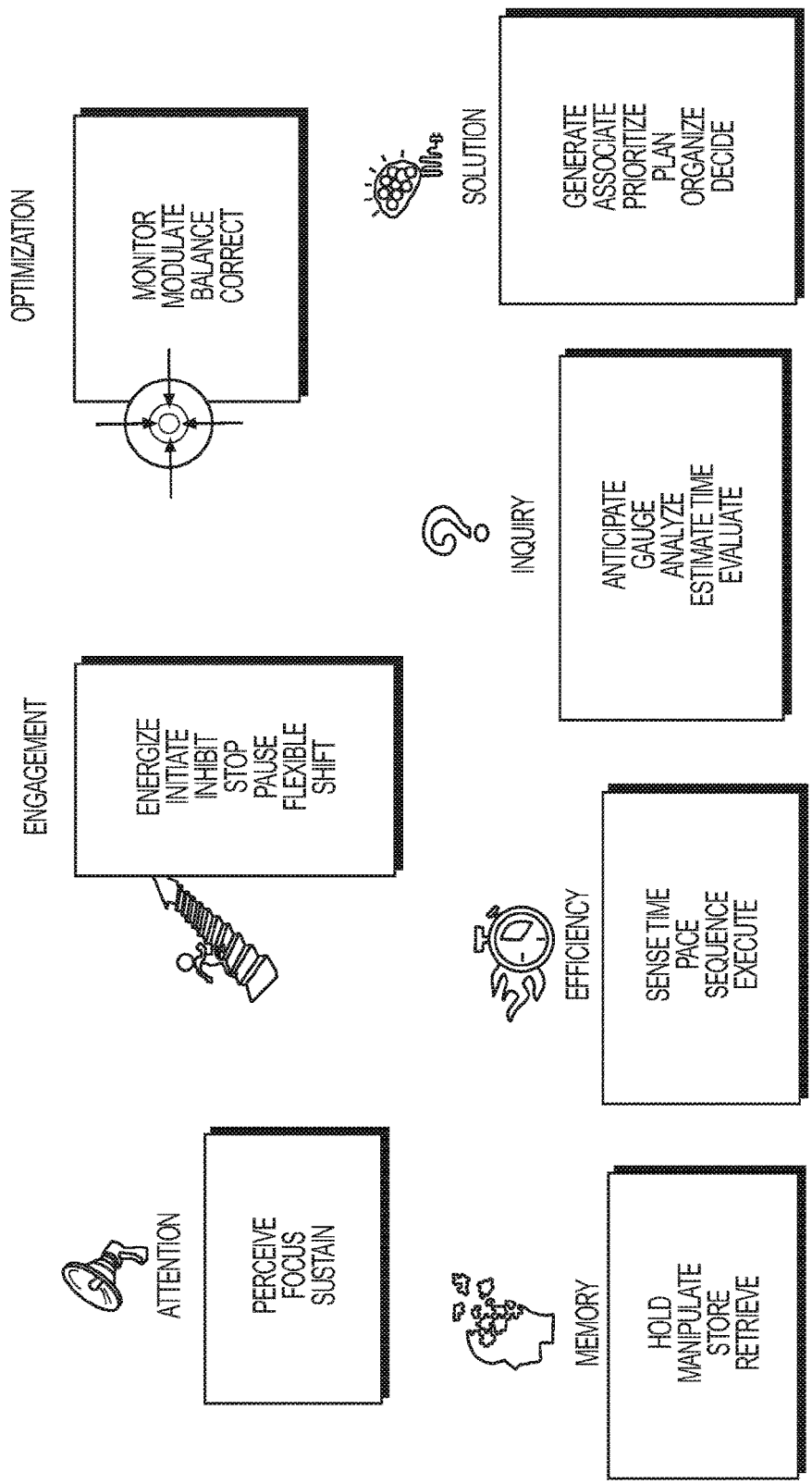
FIG. 32 is a description of 33 Self-Regulation functions with 7 clusters that can be assessed via gaming.

Executive Functions (EFs) are a set of mental processes responsible for directing a person's perceptions, emotions, cognition, and actions. Effective coordination and control of EFs allows one to take in and process information, plan actions and execute on those plans. Conversely, ineffective mastery of EFs results in behaviors that lead to difficulties in school and work environments. According to Dr. George McCloskey, creator of the "Holarchical Model of Executive Functions", there are five different levels of executive control. Referring to FIG. 31, in Self-Regulation level, the HMEF specifies 33 separate EF skills. About 15 of these Self-Regulation EF skills may be assessed through games as described in FIG. 32.

John Holland's work on career interests helps people explore careers based on how they like to spend their time. Professor John Holland from Johns Hopkins University developed a typology of career preferences over years of research on the topic. The Holland occupational preference typology is commonly referred to using the acronym for the various types in Holland's model—RIASEC. Holland suggested that peoples' preferences fit into one or more categories: realistic (doers), investigative (thinkers), artistic (creators), social (helpers), enterprising (persuaders) and conventional (organizers). These six categories describe a preference for particular work-related environments. Implicit in the theory is the concept that a person's career should reflect a person's preferences in order for that person to find fulfillment in his or her chosen career. For example, an "outdoor person" will not enjoy sitting in an office cubicle environment all day. Holland's RIASEC typology helps to highlight for people what types of work environments they may find the most interesting, and this typology has wide acceptance among career counseling professionals over the past many decades. RIASEC and the Holland codes are further described in FIG. 33.

In an embodiment, the systems and methods of identifying an individual's abilities, skills and interests may combine an understanding of a person's ability (Gardner's abilities and Executive Function skills) with an understanding interests described by Holland, thereby enabling the pursuit of educational/vocational options consistent with each individual's profile.

FIG. 1 is a system diagram illustrating an overview of example system of identifying an individual's abilities, skills and interests according to an embodiment. For example, a server 20 comprises a processor and memory. The memory coupled to the processor may comprise at least one executable instruction that when executed by the processor causes the processor to effectuate operations comprising receiving game data indicative of a plurality of games, determining a first comparative game performance associated with a first game of the plurality of games, deriving a personal character from the first comparative game performance, and providing an indication of the personal characteristic.

Each game of the plurality of games is designed to assess at least one personal characteristic such as human abilities, cognitive skills, and career interests. As shown in FIG. 1, each game of the plurality of games may be implemented in a mobile communication device 12, tablet 14, computer 16, and multimedia console game 18 to assess the an individual's abilities, skills and interests. Each game may transmit the game data to a server 20 over wireless and/or wired network. The first comparative game performance is determined, for example, based on the game data and comparative game information. The comparative game information may indicate a comparison between game performance associated with the first game and respective game performance associated with at least one other game of the plurality of games.

Figure 2:
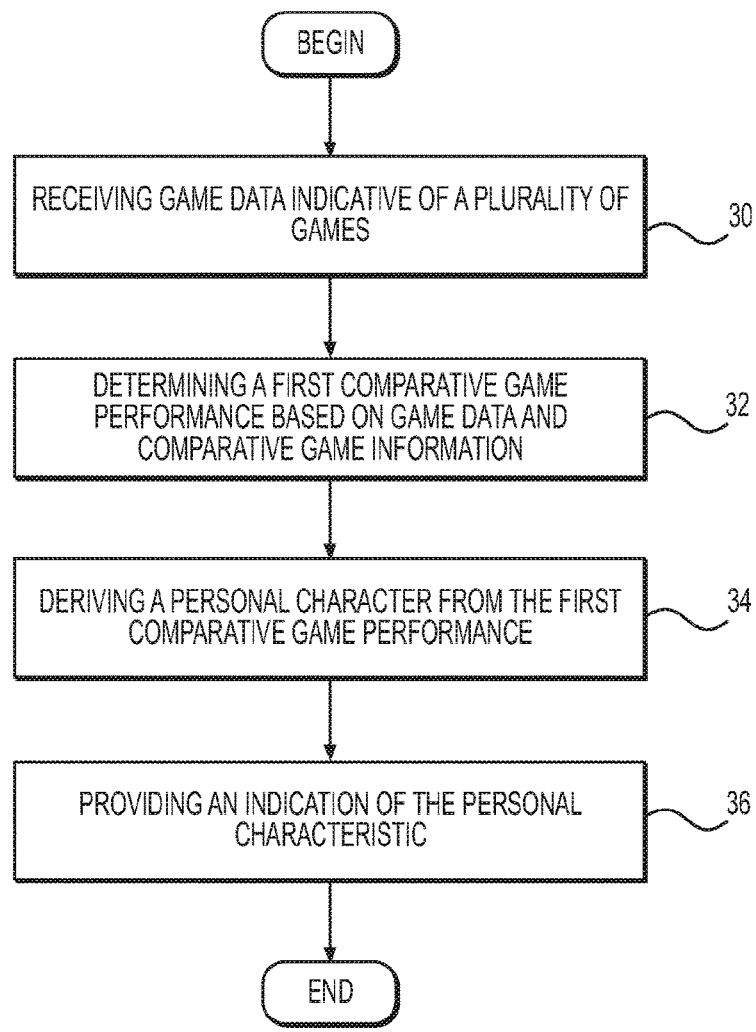
FIG. 2 illustrate an example flow for identifying an individual's abilities, skills and interests according to an embodiment.

FIG. 2 illustrates an example flow for identifying an individual's abilities, skills and interests according to an embodiment. For example, at step 30, game data indicative of a plurality of games is received at a server from each game of the plurality of games designed to assess at least one personal characteristic. The personal characteristics may comprise an individual's abilities, skills, and/or interests.

Upon receiving the game data, a first comparative game performance associated with a first game of the plurality of games may be determined by the server at step 32. The first comparative game performance is determined, for example, based on the game data and comparative game information. The comparative game information may indicate a comparison between game performance associated with the first game and respective game performance associated with at least one other game of the plurality of games. At step 34, a personal character from the first comparative game performance may be derived and at step 36, an indication of the personal characteristic may be provided by the server.

In an embodiment, players may play games on PCs, mobile phones, tablets, or multimedia console games. Those games can be designed to assess some aspects of Gardner's Multiple Intelligence through focus of games: linguistics, logic-arithmetic, spatial, music. There is no defined way of measuring multiple intelligences similar to an IQ test. A directional understanding of a person's abilities, skills and interests not an "MI score" can be provided. This understanding can be obtained through games that get increasingly difficult and thus require special skills/intelligence in a particular area to advance to the highest levels. By analyzing the data on how a player reacts to the challenges posed, a sense of how a player compares to others who have played that game can be obtained. If a player is among the top 10% of all players, chances are this could be an area of strength.

The games may accurately capture multiple intelligences. Some intelligence, for example, logic, math, visual, and spatial, can lend themselves better to being evaluated by games than others. Additional games may be created to assess interpersonal skills while developing/integrating new technologies to use Xbox Kinect to assess bodily-kinesthetic abilities.

The games can be designed to assess Executive Functions, focusing on the 33 Self-Regulation functions and moving to Self-Realization and Self-Determination. Executive Functions is traditionally measured through direct observation by trained psychologists and professionals. Dr. McCloskey advanced the field by creating the McCloskey Executive Function Scale (MEFS). The MEFS can be completed by parents, educators, other professionals, and the individual himself/herself if able to provide a 360° view of a person. In addition to direct observations through the MEFS, the games can also provide a profile of a player on some of the EF skills that can be detected using games.

It is believed that effective Executive Function is critical in both the classroom and the workplace. Effective mastery of EF skills may allow a person to pay attention, engage, optimize his/her plans to achieve efficiency, and generate/execute solutions. These are skills that enable success in both the classroom and the workplace.

The games can be designed to assess Holland interest battery through interactive version of the Career Interest Survey. In assessing the RIASEC, the traditional RIASEC word-based survey is not likely used because a significant portion of individuals with autism, dyslexia, etc. has difficulties using these tools. Instead, image-based career interest assessment tool can be used to assess the career interest. The image-based career interest assessment tool may ask participants to choose between pairs of careers that are presented using text, images, and voice. This multi-media presentation of the RIASEC types can maximize the likelihood that the test taker truly understands each item. Using the science of discrete choice analysis, the most preferred work environments can be inferred more effectively than more conventional approaches. The career interest assessment to identify an individual's primary work interests can be used. This information, in turn, can be used to identify possible careers the individual may find fulfilling.

In an embodiment, the games requiring bodily movement can be designed to assess aspects of body-kinesthetic. For example, the games using Xbox Kinect motion detector assess the aspects of bodily-kinesthetic. In another embodiment, the games can be designed to remotely assess the individual's abilities, skills and interests described above using video conferencing tools such as Skype. In addition, the games can also be designed to perform in-person assessments at centers around the country or world.

Figure 3:
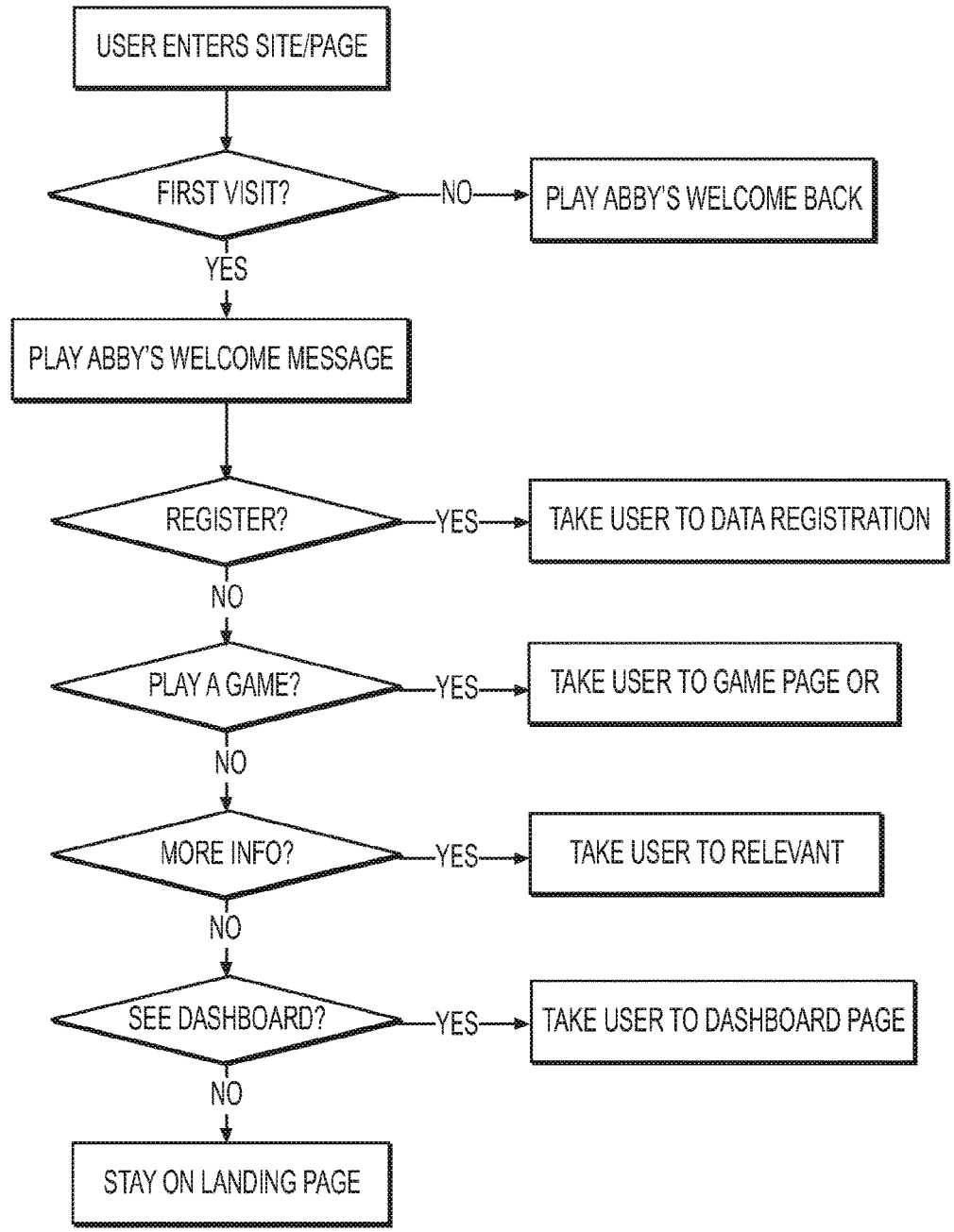
FIG. 3 illustrates an overall flow of a website for identifying an individual's abilities, skills and interests according to an embodiment.

FIG. 3 illustrates a top-level process flow of a website to identify an individual's abilities, skills and interests according to an embodiment. As shown in FIG. 3, a user who enters the website that implements the systems and methods to identify an individual's abilities, skills and interests may register his account, play games, receive information about Howard Gardner's Multiple Intelligences work, Executive Function, and John Holland's work on career interests, and review the results for completed games through dashboard.

Figure 4A:
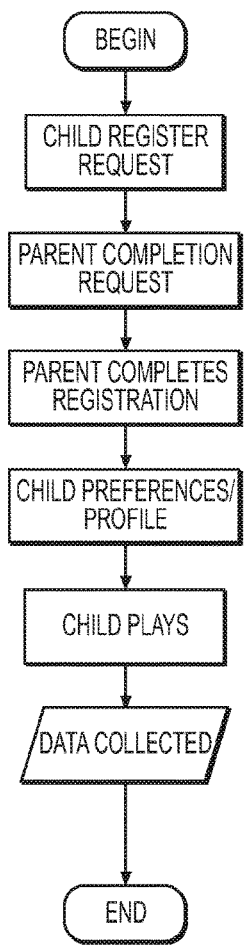
FIG. 4A-E illustrates account registration flows of a website for identifying an individual's abilities, skills and interests according to an embodiment
Figure 4B:
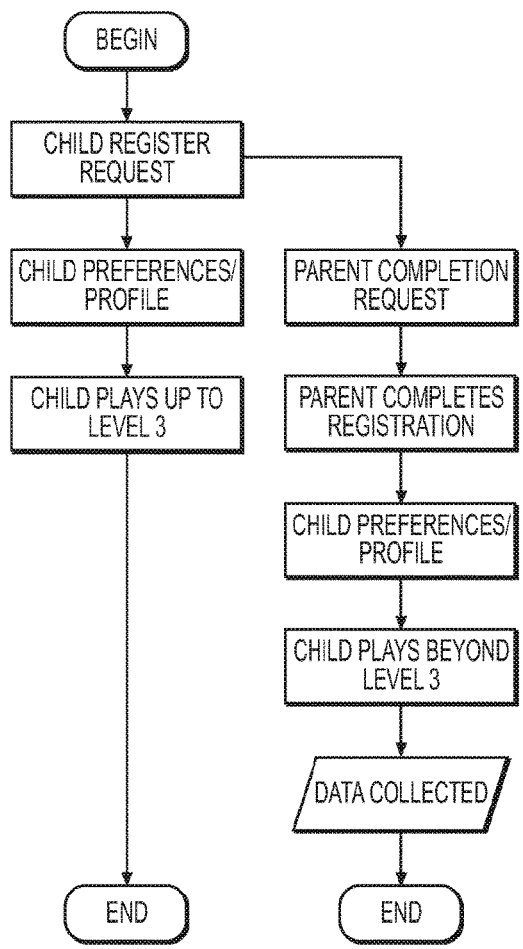
Figure 4C:
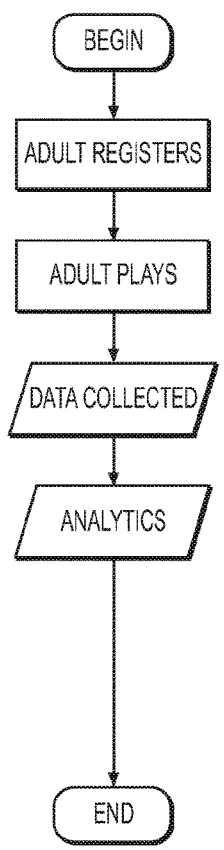
Figure 4D:
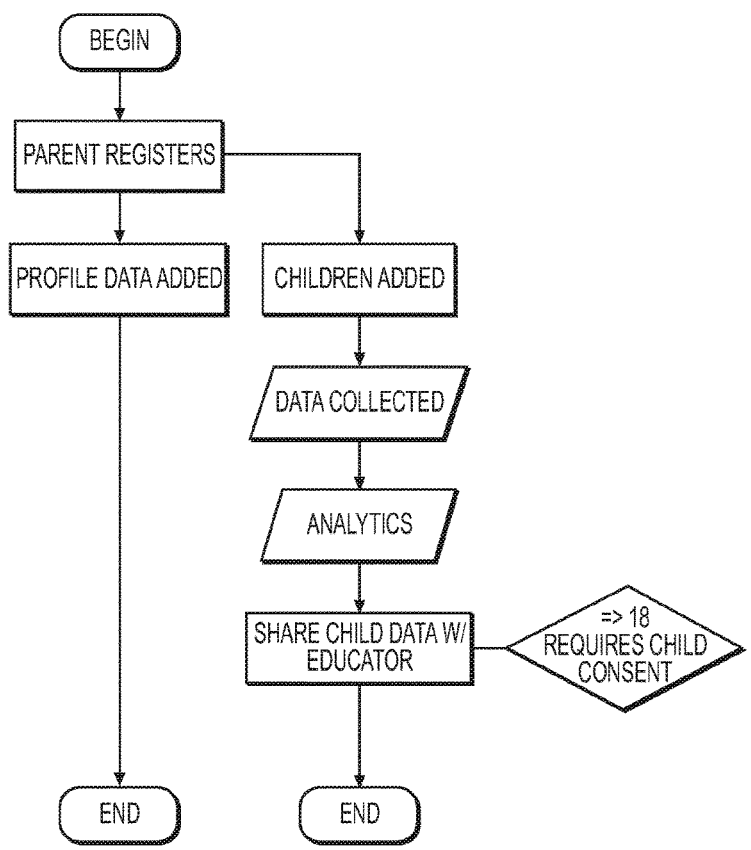
Figure 4E:
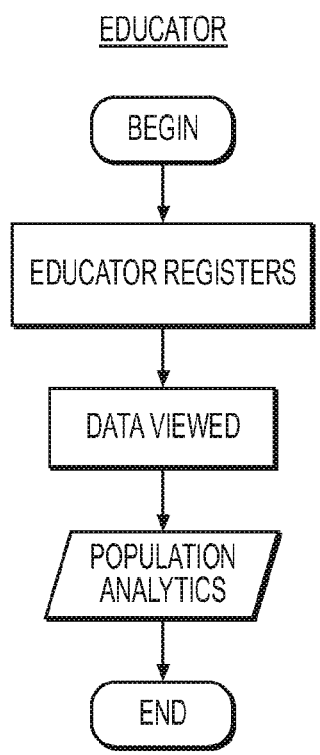

FIG. 4A-E illustrates various account registration flows of a website to identify an individual's abilities, skills and interests according to an embodiment. The website may have different registration algorithms based on the users' age. FIG. 4A illustrates an account registration flow for children who are 12 or under 12 years old. FIG. 4B illustrates an account registration flow for children between 13 and 17 years old. FIG. 4C illustrates an account registration flow for children or adults over 18 years old. FIG. 4D illustrates an account registration flow for parents. FIG. 4E illustrates an account registration flow for educators.

In an embodiment, registration can be free and required to enable users to have complete access to all levels in the games. A subscription can be required to access the parents' reports on the child's abilities, skills, and interests. These reports may provide invaluable insights that help parents explore areas of strengths and plan for productive futures for their child.

Figure 5:
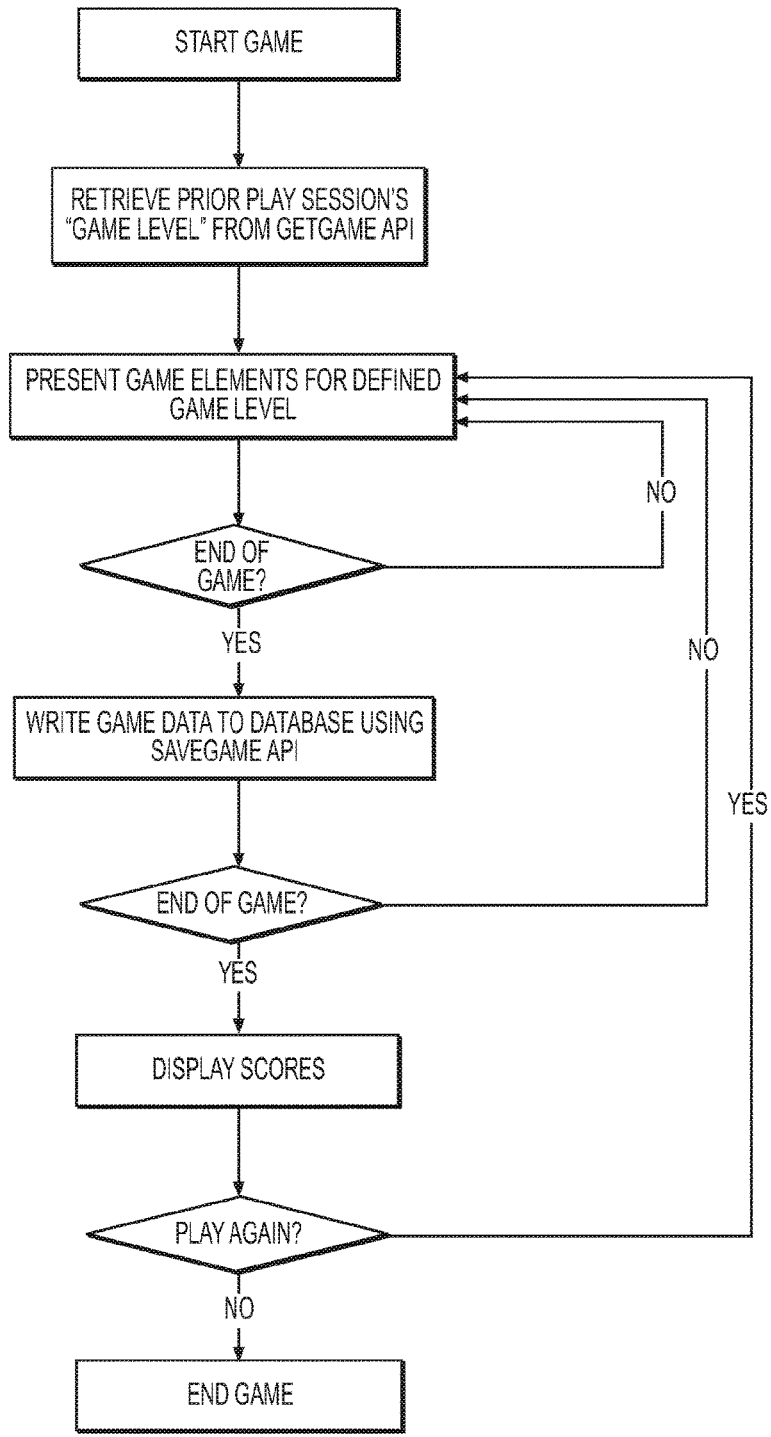
FIG. 5 illustrates a data collection flow of a game designed to assess an individual's abilities, skills and interests according to an embodiment
Figure 6:
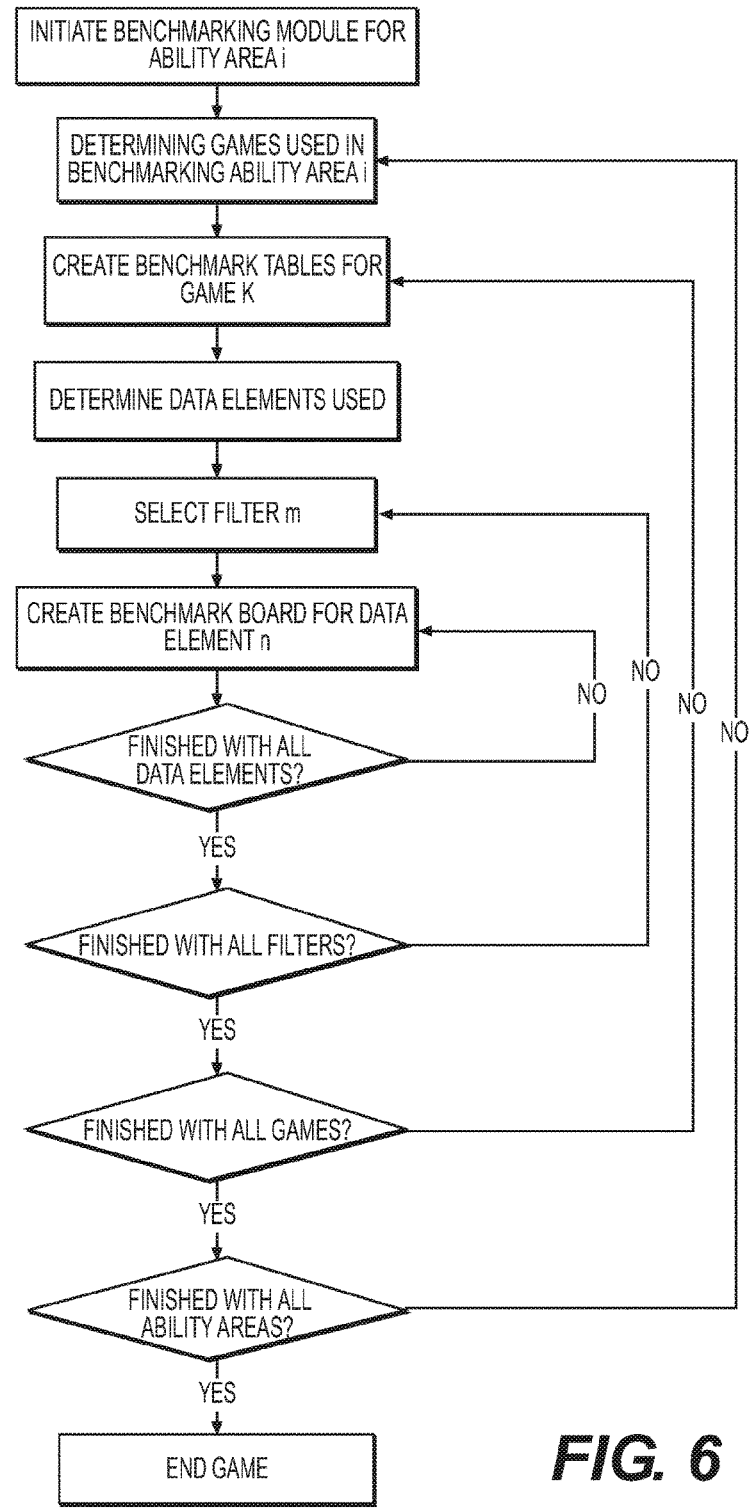
FIG. 6 illustrates an example flow of generating comparative game information according to an embodiment.

FIG. 5 illustrates a data collection flow of a game that is designed to assess an individual's abilities, skills and interests according to an embodiment. When a user plays a game, game data is stored to database using application programing interface (API). The game data can be transmitted to a cloud server over the wired/wireless network. Examples of data elements collected for each level and round by various games are:

Date/time stamp
Level Number
Level Successfully Completed (Yes/No)?
Score
Amount of time available
Amount of time used
% of available time used
Number of cars in lot
Theoretical minimum # moves
Moves taken
Number of mirrors used
Theoretical minimum mirrors needed
Hint mode was used (Yes/No)
word possible
words correct
words missed
Number of squares on grid
Was Incorrect click on a Number or Empty Space
High number in sequence to be remembered
hidden eggs
eggs found \# wrong clicks
\# times hint was used
\# Correct answers
\# Wrong answers
\# children in level
\# adults in level
\# elderly in level
\# problems shown in level
Number of Incorrect Matches
Max umber of Spaces between numbers
Total # of balls presented in Line
\# Balls fired
\# Times User clicked on correct ball to complete Match
\# of Times user fired to group same numbers for bonus points
How many balls not cleared at end
\# Unique Items shown
Number of Duplicated Items shown
Number of Non-Clicked Duplicated Items
\# of correct clicks
\# of incorrect clicks
\# of Shapes Shown
\# shapes used
\# shapes discarded
\# shapes untouched
\# of Rotations
Total # of Cubes
\# of Visible Cubes
\# of Hidden Cubes
\# of wrong answers
\# of Seesaws
\# of Weights In Problem
\# incorrect answers
\# Images to compare
\# Differences to find
\# wrong clicks
\# of Hints Used
Matrix size
\# of rotations
Total number of clicks
\# of Bulbs
Total # of Clicks
Theoretical minimum number of clicks to complete
\# Resets FIG. 6 illustrates an example flow of generating comparative game information according to an embodiment. The comparative game information may indicate how the player plays in comparison to other players in the games. The comparative game information may have a format of benchmarking tables.

Referring to FIG. 6, the process for preparing benchmarking tables may go through all the players who have played the various games to create benchmark table. The benchmark table can help determine the scores and/or performance level required to be at the $99^{th}$ percentile, $98^{th}$ percentile, etc. As shown in FIG. 6, the Ability Area can be Logic, Math, Music, Attention, Focus, etc. The filters may provide the ability to look at all players or select the comparison set based on (among other possibilities): gender, age, clinical diagnosis, etc. In an embodiment, a batch process can be initiated periodically, for example, hourly, every x hours, or daily. The periods for the batch process may be predetermined.

Figure 7:
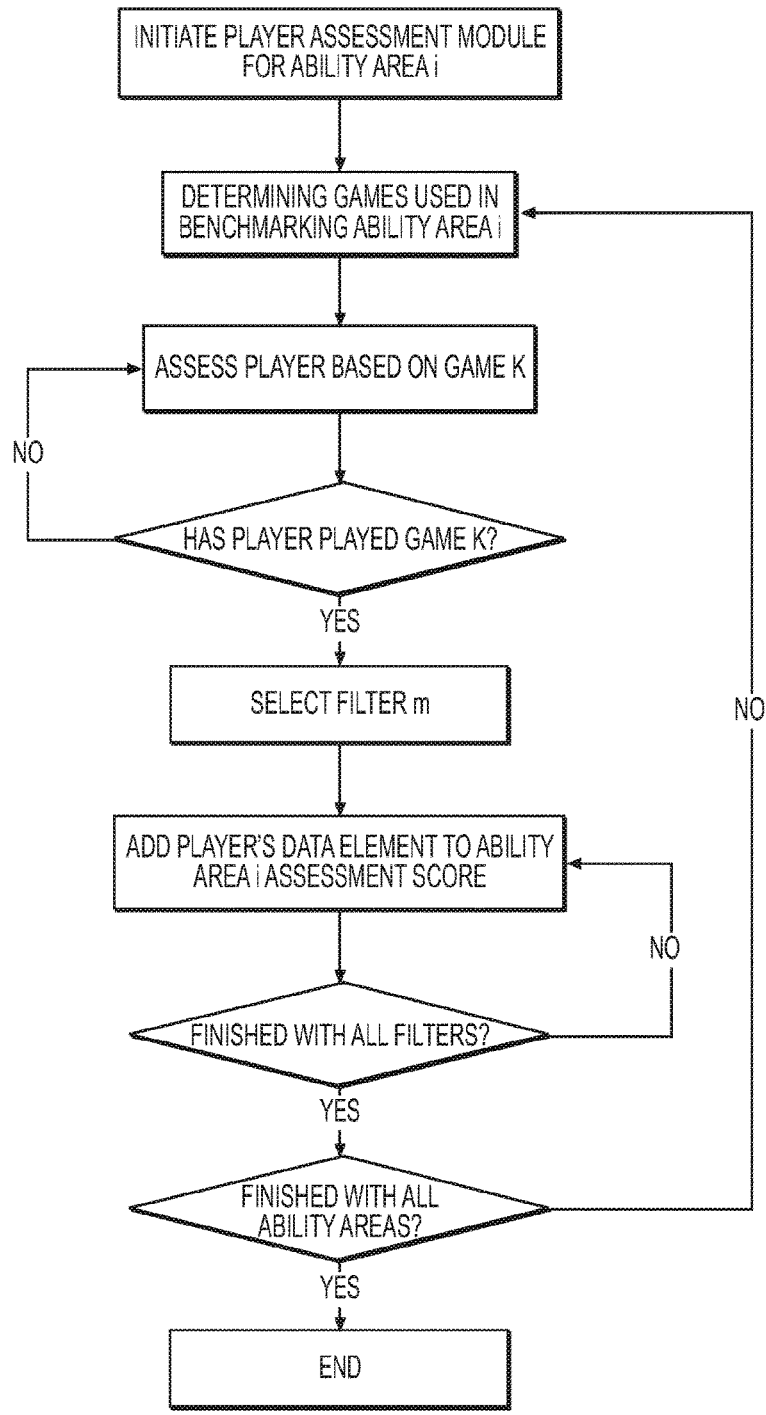
FIG. 7 illustrates an example flow of determining a player's performance according to an embodiment.

FIG. 7 illustrates an example flow of determining a player's performance according to an embodiment. As described in FIG. 6, once the benchmark tables have been calculated, the process for determining player's levels can be used to determine how each player in the database stands in comparison to all other players using data from the games that the player has played. In FIG. 7, the Ability Area can be Logic, Math, Music, Attention, Focus, etc. The filters may provide the ability to look at all players or select the comparison set based on (among other possibilities): gender, age, clinical diagnosis, etc. In an embodiment, a batch process can be initiated periodically, for example, hourly, every x hours, or daily. The periods for the batch process may be predetermined.

Figure 8:
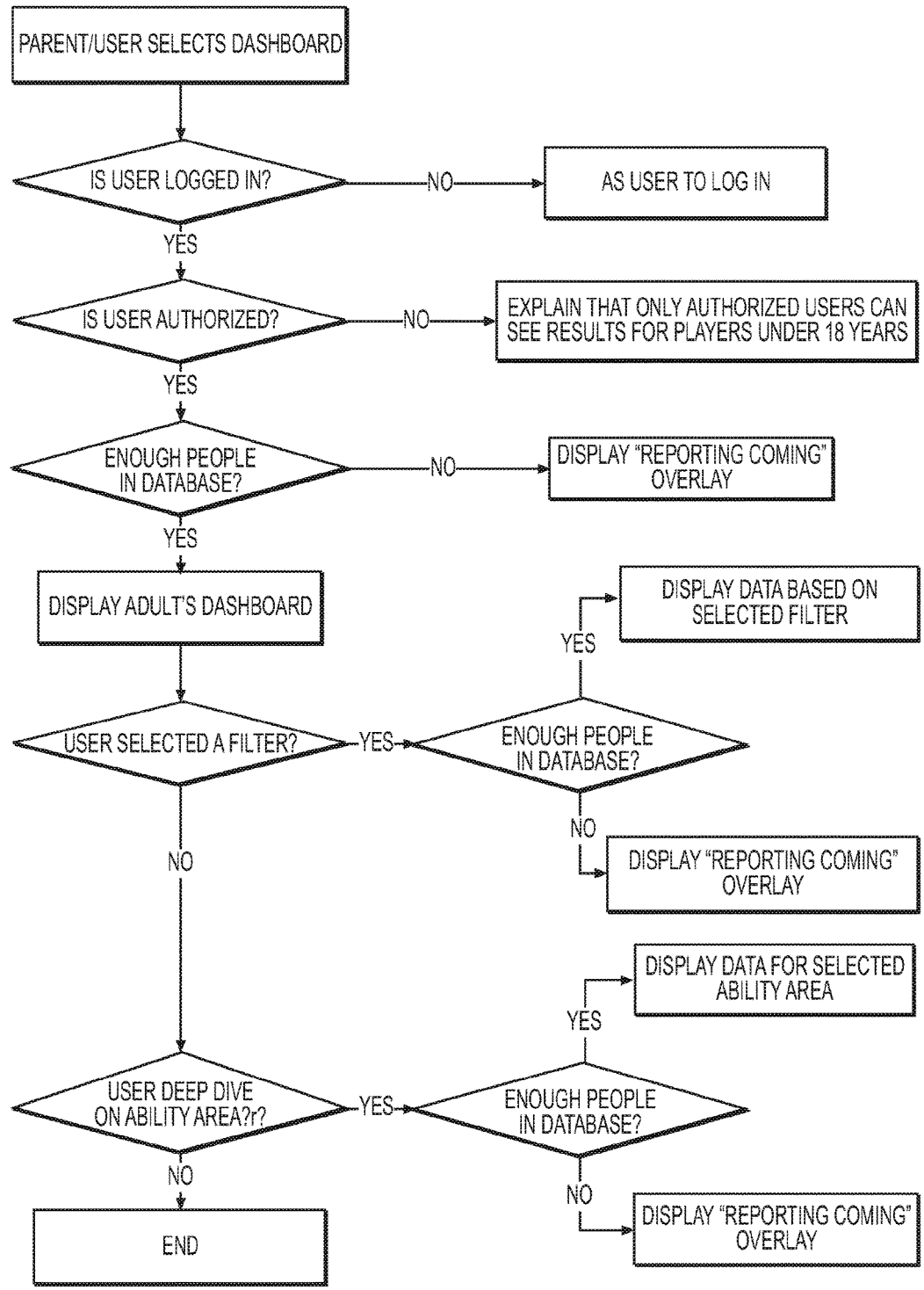
FIG. 8 illustrates an example flow of reporting a player's relative performance according to an embodiment.

FIG. 8 illustrates an example flow of reporting a player's relative performance on dashboard according to an embodiment. Once a player's relative performance to other players' performance in various filter groups have been determined, the resulting data can be shown to parents and other authorized adults using dashboard. In FIG. 8, the Filters may provide the ability to look at all players or select the comparison set based on (among other possibilities): gender, age, clinical diagnosis, etc. The Ability Area can also be Logic, Math, Music, Attention, Focus, etc.

Figure 9:
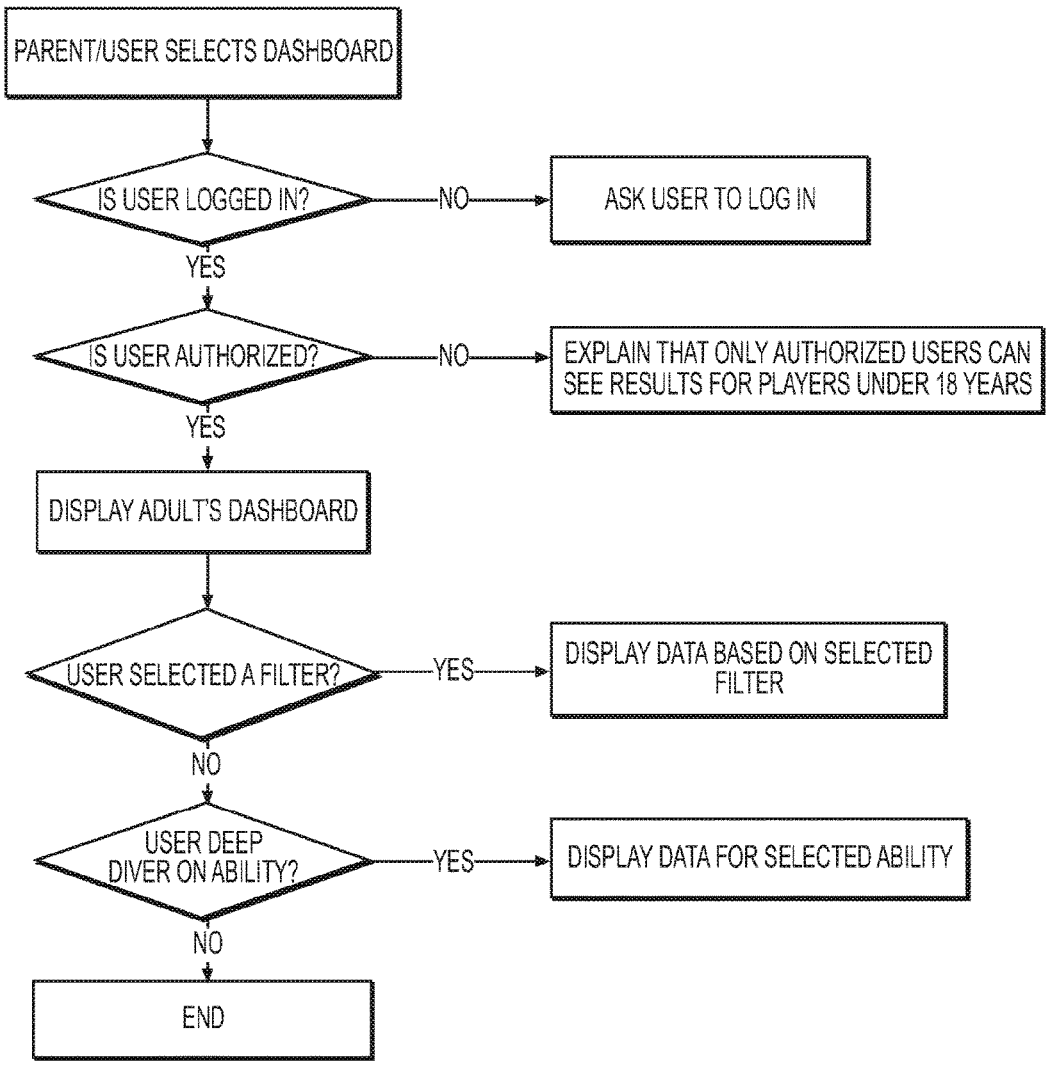
FIG. 9 illustrates another example flow of reporting a player's relative performance according to an embodiment.

FIG. 9 illustrates another example flow of reporting a player's relative performance according to an embodiment. As described in FIG. 8, once a player's relative performance to other players' performance in various filter groups has been determined, the resulting data can be shown to parents and other authorized adults using dashboard. In FIG. 9, the Filters may provide the ability to look at all players or select the comparison set based on (among other possibilities): gender, age, clinical diagnosis, etc. The Ability Area can also be Logic, Math, Music, Attention, Focus, etc.

In an embodiment, game results and reports can be sent to parents and/or professionals who subscribe to the service. The authorized parents and/or professional can view reports on an individual through the website. Parents (or subscribing educator/professionals) may have the option of sending the reports to others with the parent's discretion.

Figure 10:
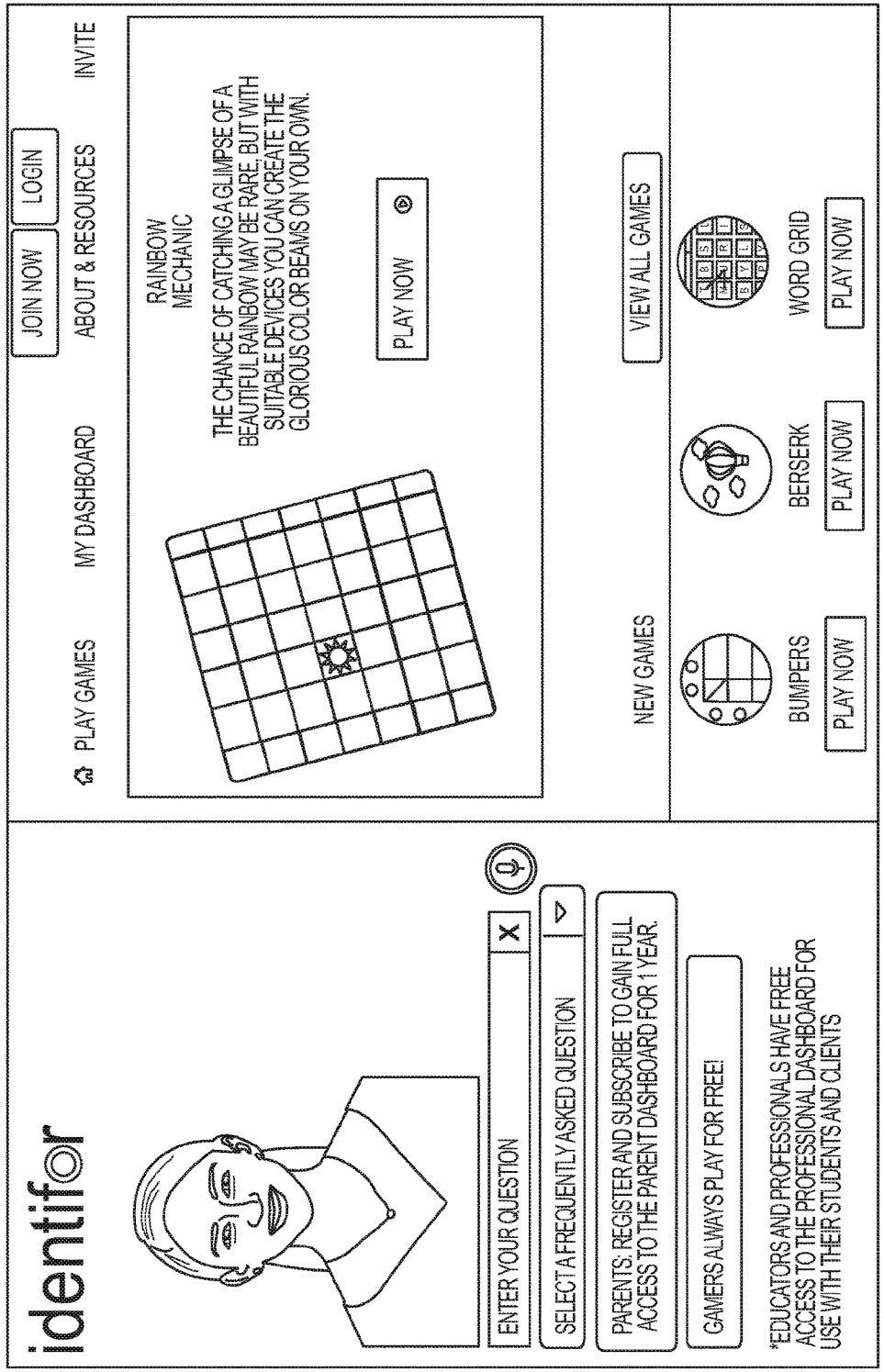
FIG. 10 is a screenshot of an example website for identifying an individual's abilities, skills and interests when a user enters the website according to an embodiment.

FIG. 10 is a screenshot of an example website to identify an individual's abilities, skills and interests when a user enters the website according to an embodiment. In an embodiment, the website may include an avatar as a user interface for an artificial intelligence engine. The avatar may use artificial intelligence, natural langue, and speech recognition to engage users. The avatar can be used across multiple channels and mobile devices. The avatar may listen and respond to user's question. The avatar may also coach, educate, monitor, and remind users.

For example, the avatar may provide users information about autism, ADHD, dyslexia, other medical conditions. The avatar may also provide information about multiple intelligences, executive function, and job/career interests. The avatar may answer questions that users asks about autism, ADHD, dyslexia, other medical conditions, multiple intelligences, executive function, and job/career interests. The avatar may suggest games that a user should play. The avatar may ask players to choose between job choices. The sounds of the avatar may be implemented with a recording of a real person. The avatar can be a cartoon. The avatar can be a verbally generated personification of text.

Figure 11:
FIG. 11 is a screenshot of an example website for identifying an individual's abilities, skills and interests when a user selects play games according to an embodiment.

FIG. 11 is a screenshot of an example website to identify an individual's abilities, skills and interests when a user selects play games according to an embodiment.

In an embodiment, games can be casual games that children, teens and adults find interesting to play on their mobile phones, PCs, or tablets. These games can be designed to provide insights into three important areas: a person's multiple intelligences, Executive Functions, and career interests. Duration of a game can vary widely, ranging from a few minutes to tens of minutes. This may depend on a player's abilities to advance and interest in continuing. The game may give a player the choice to stop or continue.

In another embodiment, games can be designed to be intuitive and require no supervision. Since they examine a person's abilities, parents/adults do not help an individual play (except if the person has motor challenges and can benefit from motor support). Although the games are designed for autistic teenagers, it can be played by anyone— at any age and regardless of clinical diagnoses.

Figure 12:
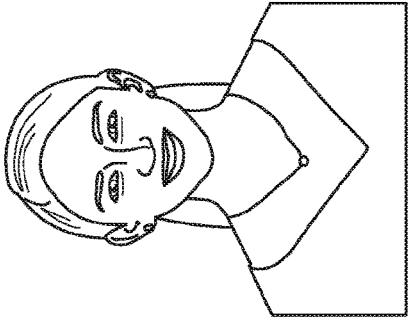
FIG. 12 is a screenshot of an example website for identifying an individual's abilities, skills and interests when a user selects an informational page to learn the individual's abilities, skills and interests according to an embodiment.
Figure 12:
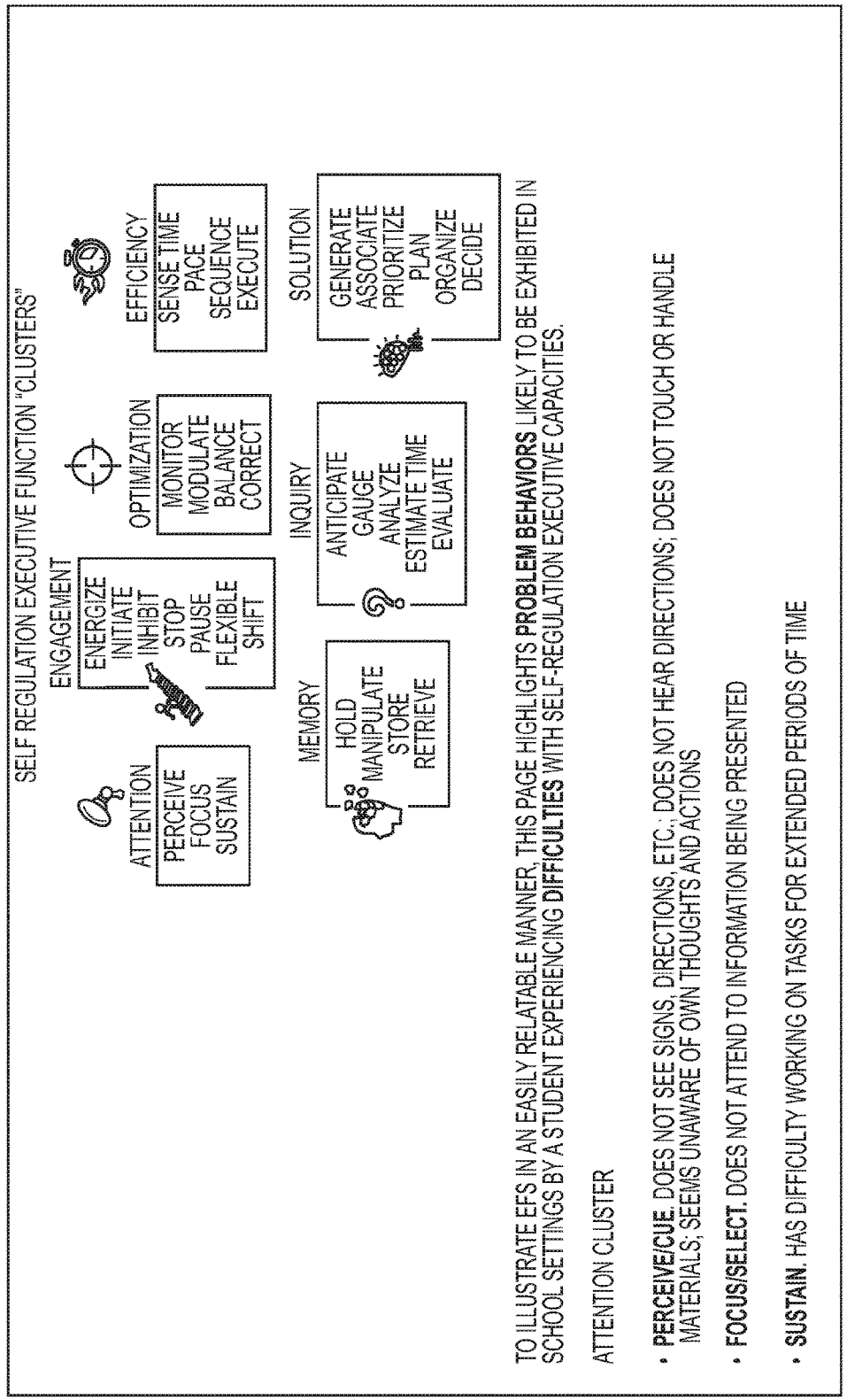

FIG. 12 is a screenshot of an example website to identify an individual's abilities, skills and interests when a user selects an informational page to learn the individual's abilities, skills and interests according to an embodiment. As shown in FIG. 12, the informational page may explain details of Howard Gardner's Multiple Intelligences, George McCloskey's work on Executive Functions (EFs), and John Holland's work on career interests.

Figure 13:
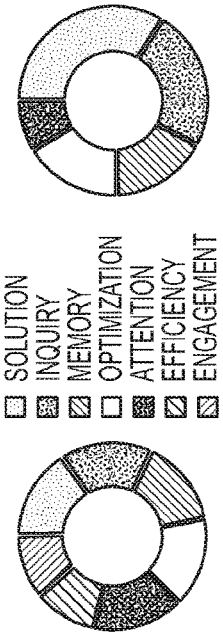
FIG. 13 is a screenshot of an example website for identifying an individual's abilities, skills and interests when a user selects a dashboard page of the individual's abilities, skills and interests according to an embodiment.

FIG. 13 is a screenshot of an example website to identify an individual's abilities, skills and interests when a user selects a dashboard page to review the results according to an embodiment. The dashboard page may include analysis of individual's Gardner intelligences, EFs, and career interests based on the game data transmitted from games.

Figure 14:
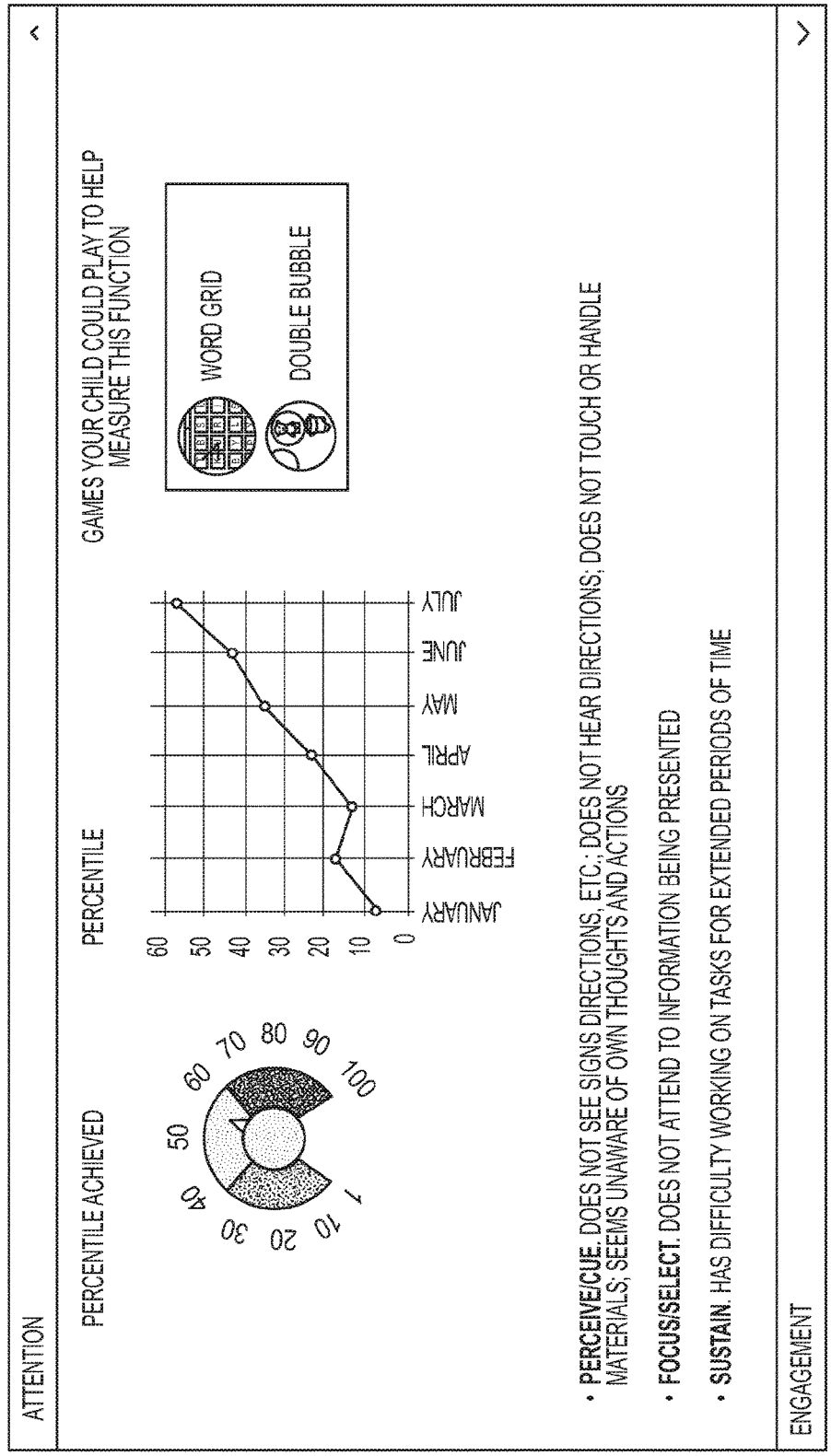
FIG. 14 is another screenshot of an example website for identifying an individual's abilities, skills and interests when a user selects a deep dive page of the individual's abilities, skills and interests according to an embodiment.

FIG. 14 is another screenshot of an example website to identify an individual's abilities, skills and interests when a user selects a deep dive page to further review the results according to an embodiment. The dashboard page may display detailed analysis for one of the individual's Gardner intelligences, EFs, and career interests.

Figure 15:
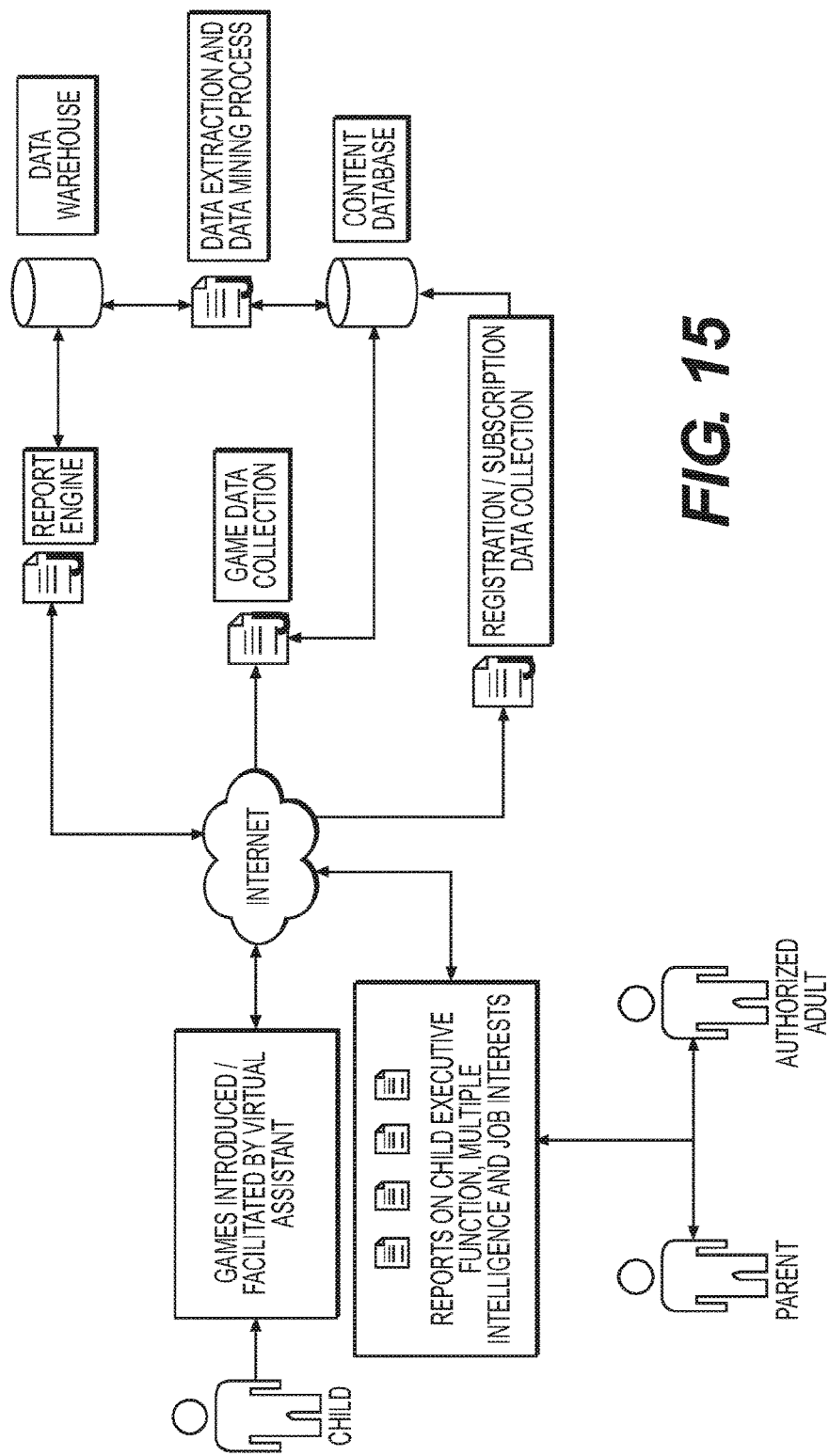
FIG. 15 is a system diagram illustrating an overview of example web system for identifying an individual's abilities, skills and interests according to an embodiment.

FIG. 15 is a system diagram illustrating an overview of example web system to identify an individual's abilities, skills and interests according to an embodiment. The system to identify an individual's abilities, skills and interests may comprise report engine, game data collection, registration/subscription data collection, data warehouse, content database, data extraction and data mining process.

Figure 16:
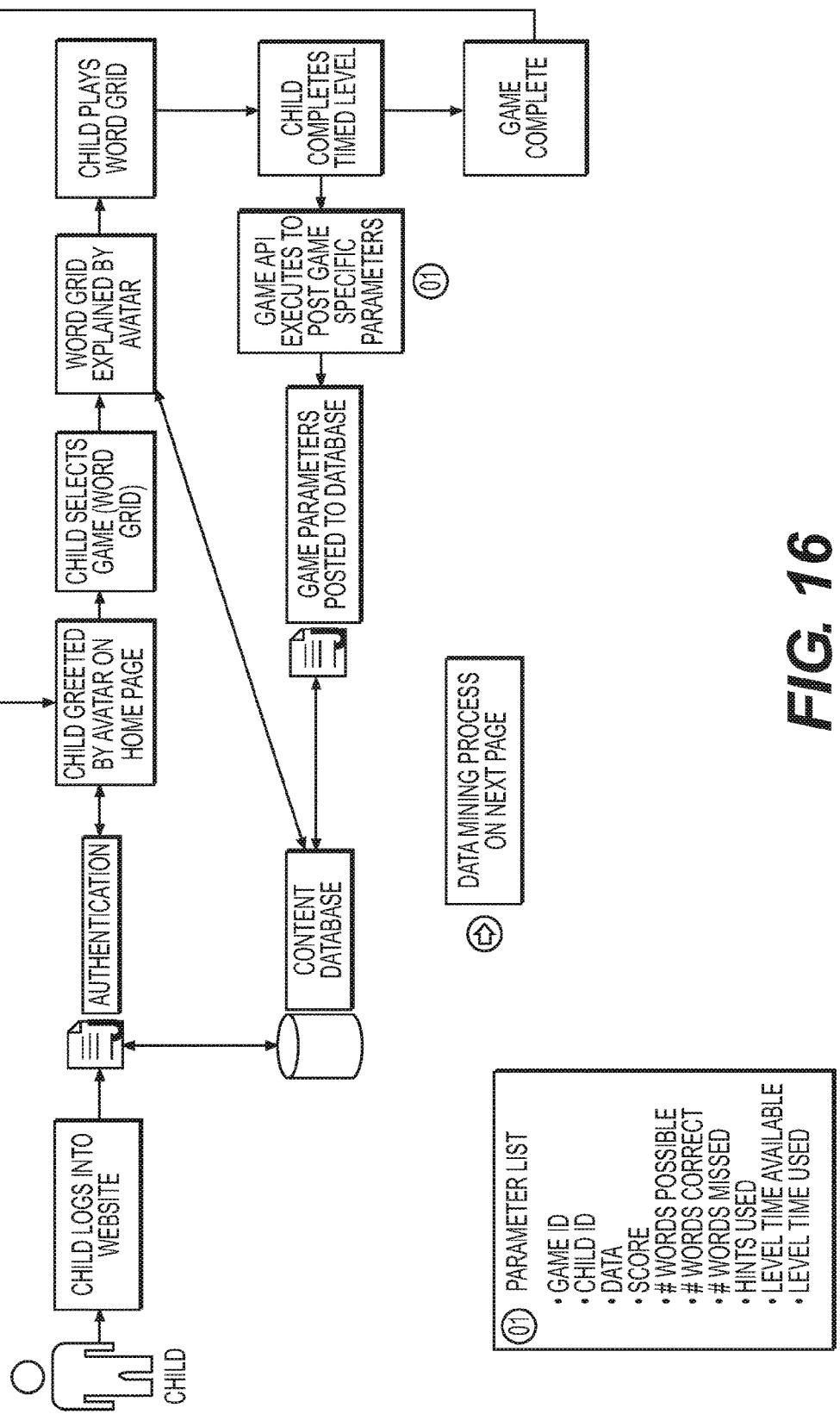
FIG. 16 is an example flow diagram illustrating that a registered user plays a game on a website for identifying an individual's abilities, skills and interests according to an embodiment.

FIG. 16 is an example flow diagram illustrating that a registered user plays a game on a website to identify an individual's abilities, skills and interests according to an embodiment. In this example embodiment, a registered child age of 13 may return to the site to play game such as Word Grid. For example, the child logs into the website and authentication is performed to check whether the child is an authorized user. Once the child is authenticated, the child is greeted by a human avatar on the home page. If the child selects a game such as Word Grid, the game is explained by the human avatar. The child plays Word Grid. Once the child completes timed level, game API executes to post game specific parameters to content database. The parameter may include: Game ID, Child ID, Date, Score, # Words Possible, # Words Correct, # Words Missed, Hints Used, Level Time Available, and Level Time Used.

Figure 17:
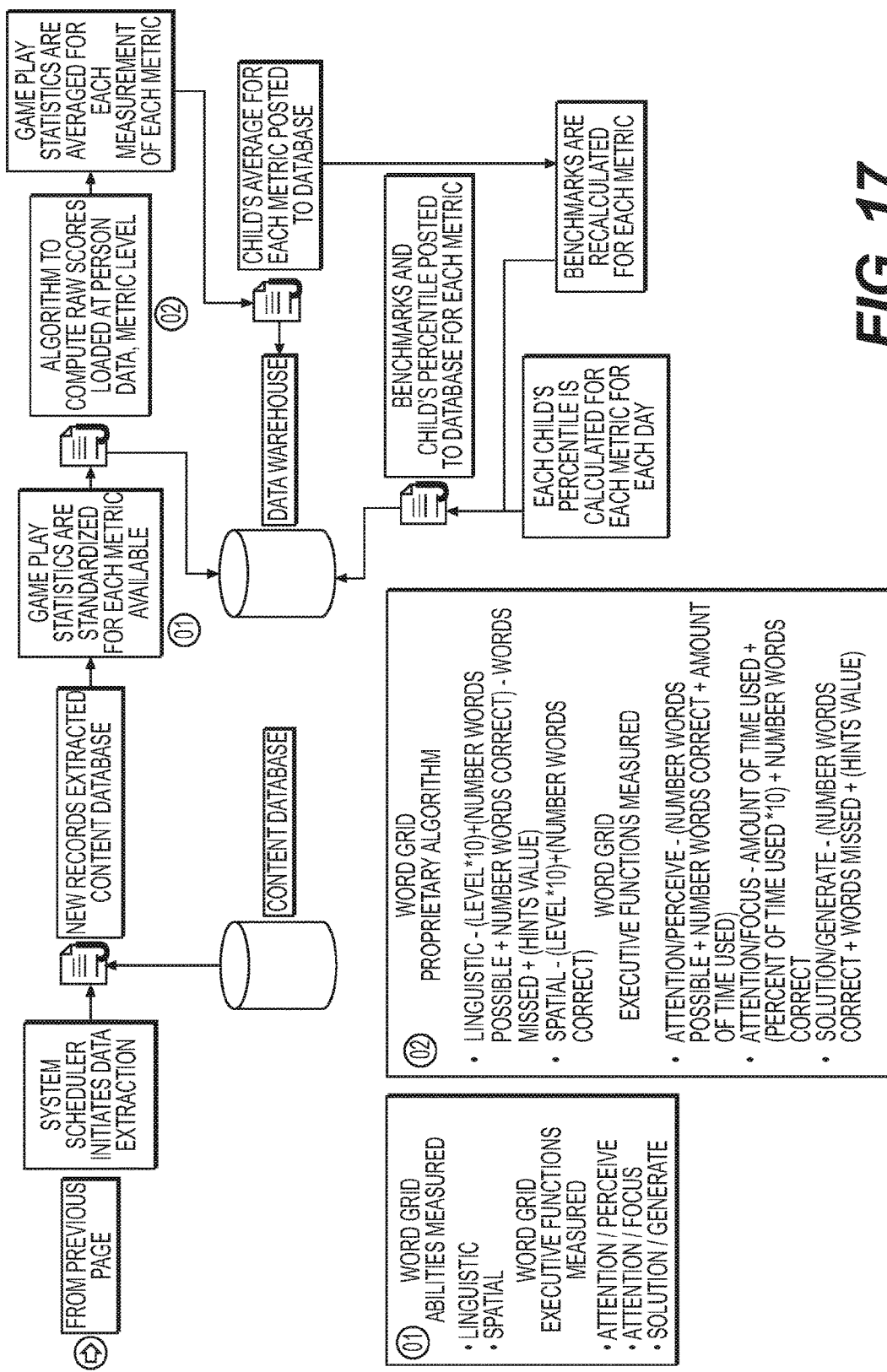
FIG. 17 is an example flow diagram illustrating data mining process when a registered user plays a game according to an embodiment.

FIG. 17 is an example flow diagram illustrating data mining process when a registered user plays a game according to an embodiment. Upon posting game specific parameters to content database, system scheduler may initiate data extraction process. Once data extraction process is initiated, new records are extracted from the content database and game play statistics are standardized for each metric available. For example, abilities measured by Word Grid may have: Linguistic and Spatial. Executive Functions measured by Word Grid may include: Attention/Perceive, Attention/Focus, and Solution/Generate. Upon the game play statistics are standardized for each metric, raw scores loaded at person, data, and metric level are computed with following equations:

Word Grid Proprietary Calculation☺
   Linguistic—(Level*10)+(number words possible+number words correct)−words missed+(Hints Value)☺
   Spatial—(Level*10)+(number words correct)
Word Grid Executive Functions Measured☺
   Attention/Perceive—(number words possible+number words correct+amount of time used)☺
   Attention/Focus—amount of time used+(Percent of time used*10)+number words correct☺
   Solution/Generate—(number words correct+words missed+(Hints Value)

Upon computing raw scores, game play statistics are averaged for each measurement of each metric and the child's average for each metric is posted to data warehouse. Benchmarks are recalculated for each metric and each child's percentile is calculated for each metric for each day. These benchmarks and child's percentile are posted to database for each metric.

Figure 18:
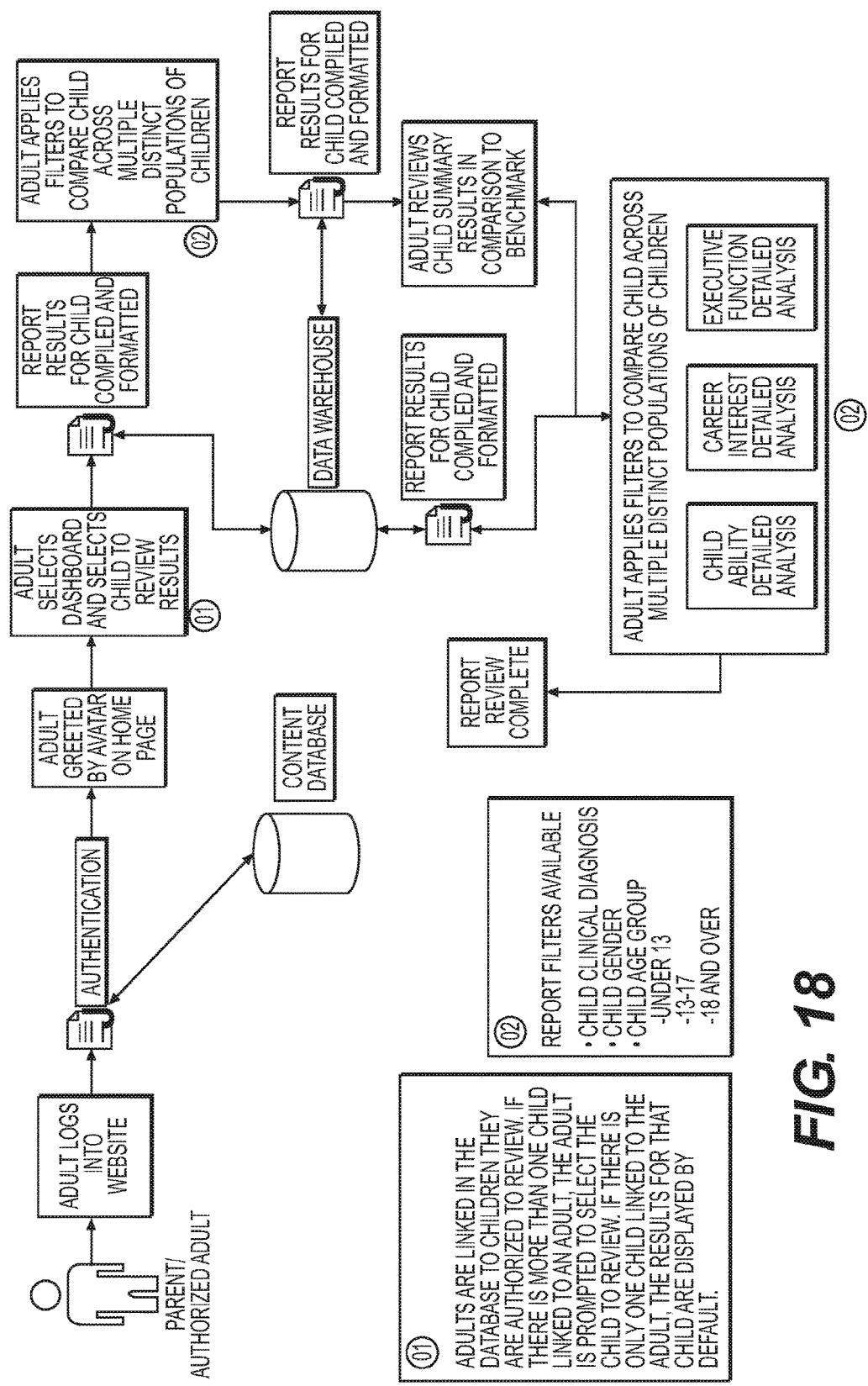
FIG. 18 is an example flow diagram illustrating reviewing player's performance by authorized individuals on a website for identifying an individual's abilities, skills and interests according to an embodiment.

FIG. 18 is an example flow diagram illustrating reviewing player's performance by authorized individuals on a website to identify an individual's abilities, skills and interests according to an embodiment. As shown in FIG. 18, parent and authorized adults may return to the website to review player's performance. The adults who want to review player's performance first logs into the website and authorization is processed for the adult. Once the adult is authorized, a human avatar greets the adult on the home page. To review player's performance, the adult selects dashboard and selects a child to review results. Adults are linked in the database to children whom they are authorized to review. If there is more than one child linked to an adult, the adult can be prompted to select the child to review. If there is only one child linked to the adult, the results for that child are displayed by default.

Upon selecting the child, result report for the child is compiled and formatted. The adult may apply filter to compare the child across multiple district population of children. Available report filters can be:
   Child Clinical Diagnosis☺
   Child Gender☺
   Child Age Group—Under 13/between 13 and 17/18 and Over After the filters are applied, result reports for the child may be compiled and formatted again. The adult may review summary results of the child in comparison to benchmark. In an embodiment, the adult can apply filters to compare the child across multiple distinct populations of children. The result reports may include child ability detailed analysis, career interest detailed analysis, and executive function detailed analysis.

Figure 19:
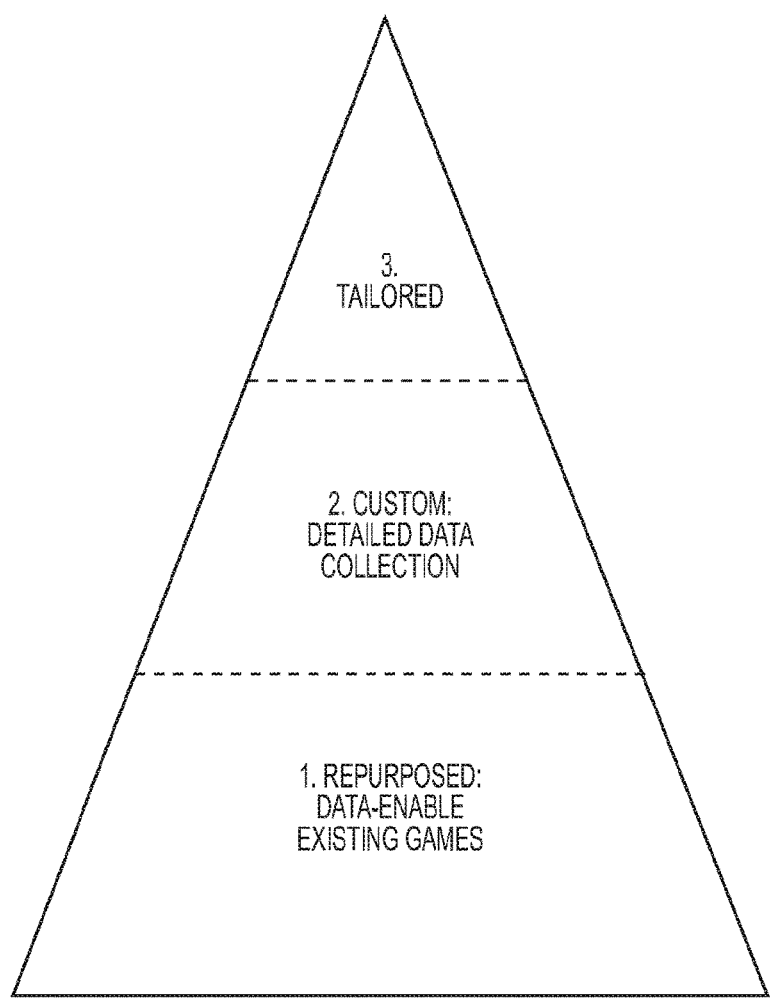
FIG. 19 illustrates types of games that can be used to identify an individual's abilities, skills and interests according to an embodiment.

FIG. 19 illustrates types of games that can be used to identify an individual's abilities, skills and interests according to an embodiment. Three types of games can be designed to assess the individual's abilities, skills and interests: repurposed, custom, and tailored. The repurposed game can be a game that is modified existing games to enable data collection. It can be applicable for selected ability areas such as math, logic, and spatial. The custom games can be a game that is developed to capture more data or to explore some areas not possible with current games. The tailored game can be a game that is developed as a new game to assess currently unassessed or under-assessed skill areas.

FIG. 20 illustrates examples of repurposed games according to an embodiment. As shown in FIG. 20, the repurposed games may assess abilities such as logic, spatial processing, visual memory, math, and linguistics. The repurposed games for logic may include: Parking Lot, Seesaw Logic, Rainbow Mechanic, and Christmas Tree Light-up. The repurposed games for spatial processing may include: Spot the Difference, Share Inlay, Count the Cubes, and Count the Sheep. The repurposed games for visual memory may include: Pattern Memory, and Memory III. The repurposed games for math may include: Bus Driver Math, and Quick Calculate. The repurposed games for linguistics may include a Word Search. Each repurpose game may also assess a number of Executive Functions, for example, focus, engagement, initiation and stop, memory manipulation, prioritization, time sensitivity, etc.

The game data for The Parking Lot collected and passed to the API when a level ends may include:
Date/time stamp
Level
Successful (yes or no)
score
amount of time available
amount of time used
percent of available time used
no of cars in lot
theoretical minimum no of moves
no of moves taken
no of times the game is extended The game data for Rainbow Mechanic collected and passed to the API when a level ends may include:
Date/time stamp
Level
Successful (yes or no)
score
amount of time available
amount of time used
percent of available time used
no of mirrors used
theoretical minimum mirrors needed
whether hint mode is used (yes or no)

Figure 21A:
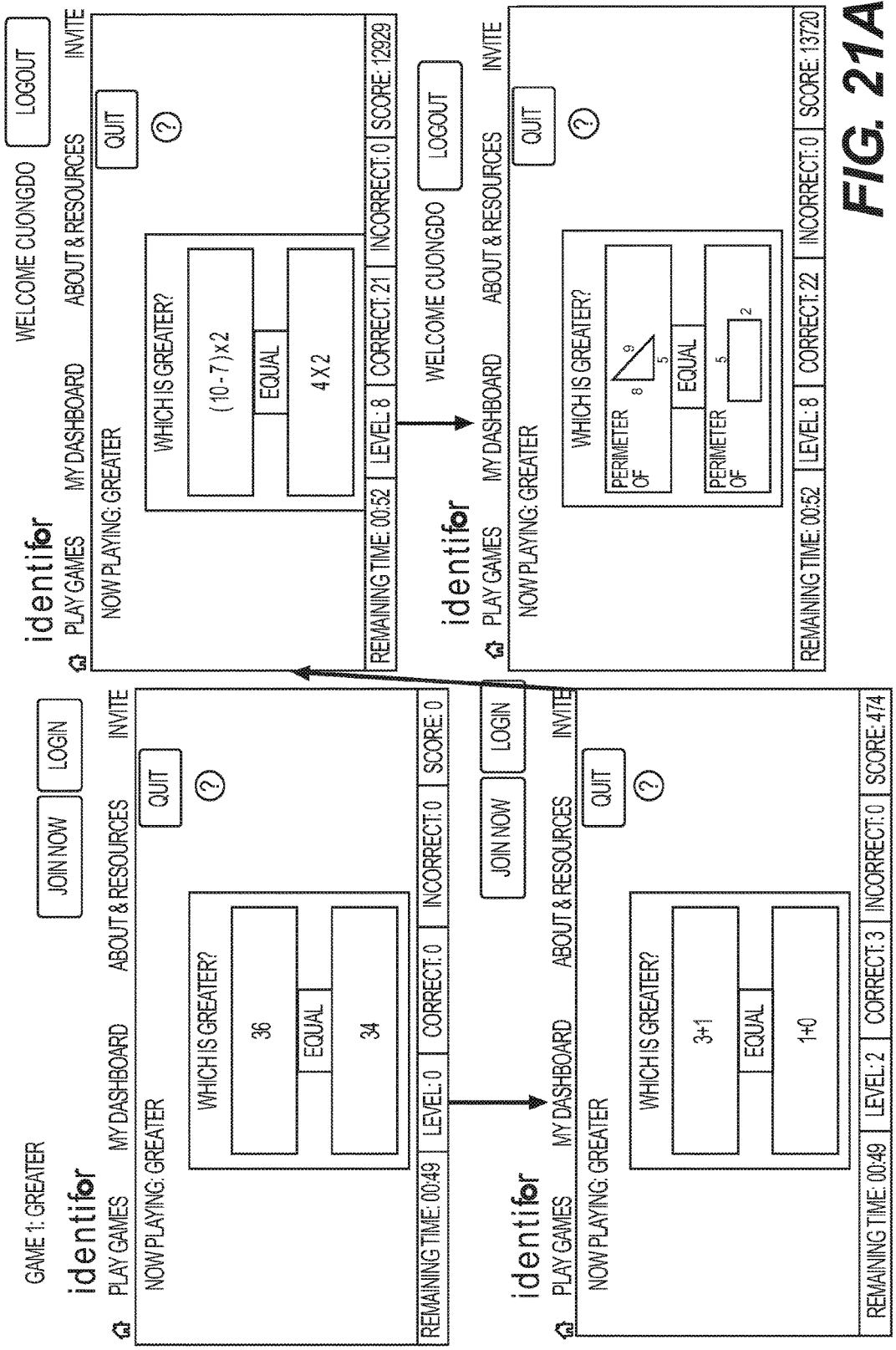
FIG. 21A illustrates an example of a custom game to collect detailed data according to an embodiment.
Figure 21C:
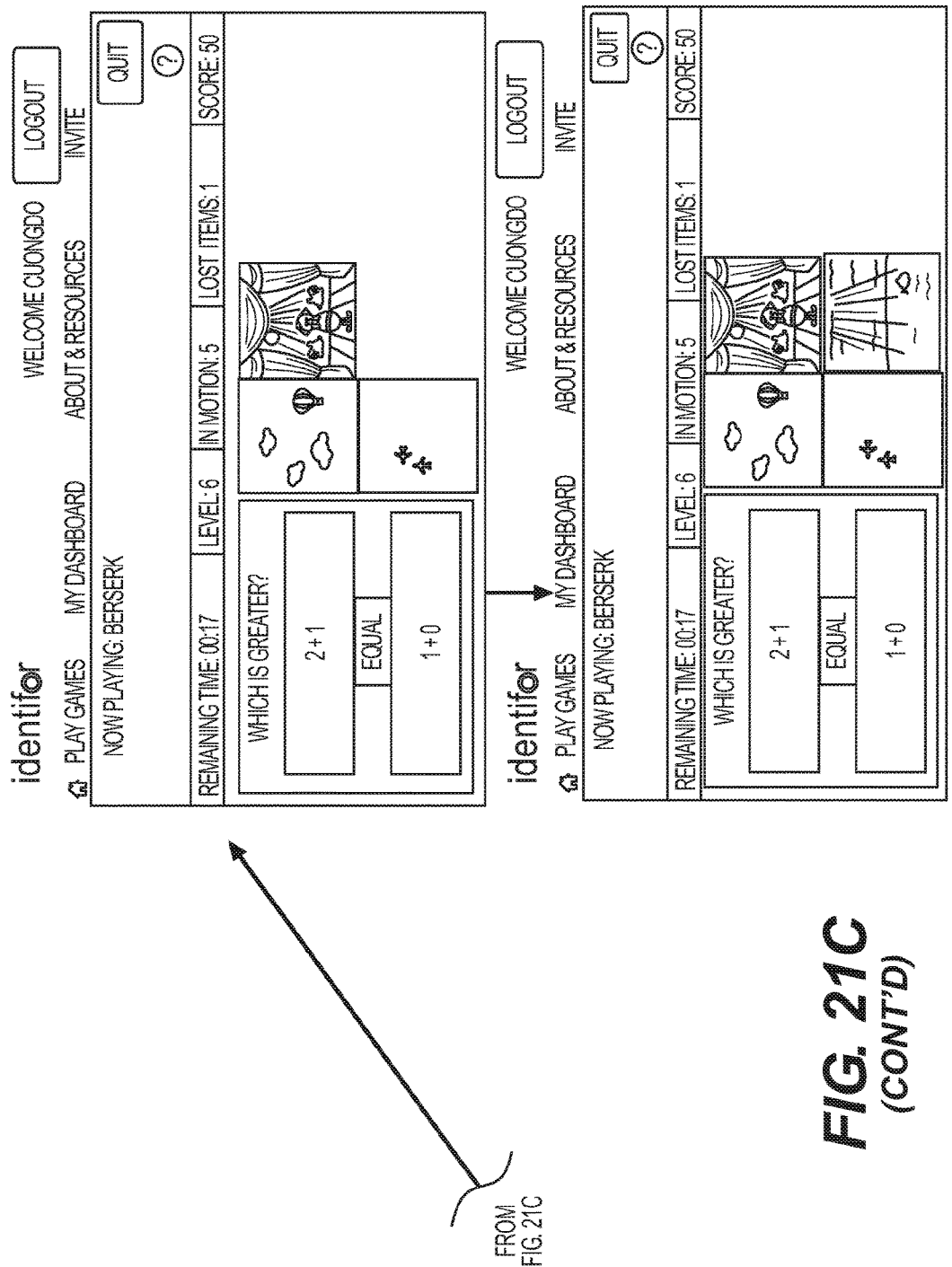
FIG. 21C illustrates yet another example of a custom game to collect detailed data according to an embodiment.

The game data for Word Grid collected and passed to the API when a level ends may include:
Date/time stamp
Level
Successful (yes or no)
score
amount of time available
amount of time used
percent of available time used
no of possible words
no of words correct
no of words missed
no of times the hint was used The game data for Sequence Master collected and passed to the API when a level ends may include:
Date/time stamp
Level
Successful (yes or no)
score
amount of time available
amount of time used
percent of available time used
no of squares on grid
was incorrect click on a number or an empty space (yes or no)
high number in sequence to be remembered
no of times the game is extended The game data for Easter Egg Hunt collected and passed to the API when a level ends may include:
Date/time stamp
Level
Successful (yes or no)
score
amount of time available
amount of time used
percent of available time used
no of hidden eggs
no of eggs found
no of wrong clicks
no of times the hint is used
no of times the game is extended The game data for Pattern Memory II collected and passed to the API when a level ends may include:
Date/time stamp
Level
Successful (yes or no)
score
amount of time available
amount of time used
percent of available time used
total no of blocks in the grid
no of colours used
no of incorrect clicks
was incorrect click on incorrect color or blank square (yes or no)
no of times the game is extended The game data for Count the Sheep collected and passed to the API when a level ends may include:
Date/time stamp
Level
Successful (yes or no)
score
amount of time available to view moving sheep
amount of time used to answer
no of sheep
no of wolves
answer provided
no of times the game is extended The game data for Bus Driver's Math collected and passed to the API when a level ends may include:
Date/time stamp
Level
Successful (yes or no)
score
no of correct answers
no of wrong answers
no of children in level
no of adults in level
no of elderly in level
no of problems shown in level The game data for Spot the Difference II collected and passed to the API when a level ends may include:
Date/time stamp
Level
Successful (yes or no)
score
amount of time available
amount of time used
% of available time used
image name
no of correct answers
no of wrong clicks
no of hints used
no of times the game is extended The game data for Number Twins collected and passed to the API when a level ends may include:
Date/time stamp
Level Successful (yes or no)
score
amount of time used
no of incorrect matches
max no of spaces between matched numbers
no of times the game is extended
The game data for Math Lines collected and passed to the API when a level ends may include:
Date/time stamp
Level
Successful (yes or no)
score
amount of time used
total no of balls appeared
no of balls fired
no of times the ball is fired to complete a match
no of times the ball is fired next to a same numbered ball
no of balls left uncleared
no of times the game is extended
The game data for More of Less collected and passed to the API when a level ends may include:
Date/time stamp
Level
Successful (yes or no)
score
amount of time used
no of squares in matrix
operator used (more or less)
no of wrong answers
The game data for Double Bubble collected and passed to the API when a level ends may include:
Date/time stamp
Level
Successful (yes or no)
score
amount of time available
amount of time used
percent of available time used
no of unique items shown
no of duplicated items shown
no of non clicked duplicated items
no of correct clicks
no of incorrect clicks
no of times the game is extended
The game data for Scene Memory collected and passed to the API when a level ends may include:
Date/time stamp
Level
Successful (yes or no)
score
amount of time available to view image
amount of time used to answer
no of items in level
no of changed items
no of correct items found
no of times the game is extended
The game data for Find the Suspect collected and passed to the API when a level ends may include:
Date/time stamp
Level
Successful (yes or no)
score
amount of time available
amount of time used
no of suspects shown
image chosen
correct image
no of times the game is extended
The game data for Find the Pair collected and passed to the API when a level ends may include:
Date/time stamp
Level
Successful (yes or no)
score
amount of time available
amount of time used
correct shape
total no of shapes shown
no of mistakes
The game data for Shape Inlay collected and passed to the API when a level ends may include:
Date/time stamp
Level
Successful (yes or no)
score
amount of time used
no of shapes shown
no of shapes used
no of shapes discarded
no of shapes untouched
no of rotations
no of times the game is extended
The game data for Quick Calculate collected and passed to the API when a level ends may include:
Date/time stamp
Level
Successful (yes or no)
score
amount of time used
question
correct answer
no of incorrect answers
The game data for Count the Cubes collected and passed to the API when a level ends may include:
Date/time stamp
Level
Successful (yes or no)
score
amount of time used
total no of cubes
no of visible cubes
no of hidden cubes
no of wrong answers
no of times the hint button is clicked
The game data for Seesaw Logic collected and passed to the API when a level ends may include:
Date/time stamp
Level
Successful (yes or no)
score
amount of time used
no of seesaws
no of weights in problem
no of incorrect answers
The game data for Spot the Difference collected and passed to the API when a level ends may include:
Date/time stamp
Level
Successful (yes or no)
score
amount of time used
no of faces shown
no of differences to find
no of wrong clicks no of hints used
no of times the game is extended
The game data for Memory III collected and passed to the API when a level ends may include:
Date/time stamp
Level
Successful (yes or no)
score
amount of time used
no of pairs shown
total no of clicks
The game data for Moving Memory collected and passed to the API when a level ends may include:
Date/time stamp
Level
Successful (yes or no)
score
amount of time used
matrix size
no of rotations
total no of clicks
The game data for Christmas Tree Light Up collected and passed to the API when a level ends may include:
Date/time stamp
Level
Successful (yes or no)
score
amount of time used
no of hints used
no of bulbs
total no of clicks
theoretical minimum no of clicks to complete
no of resets
The game data for Math Search collected and passed to the API when a level ends may include:
Date/time stamp
Level
Successful (yes or no)
score
amount of time used
equation
no of wrong answers
no of times the game is extended
The game data for Memory collected and passed to the API when a level ends may include:
Date/time stamp
Level
Successful (yes or no)
score
amount of time used
total no of clicks
The game data for Tower of Hanoi II collected and passed to the API when a level ends may include:
Date/time stamp
Level
Successful (yes or no)
score
amount of time used
total no of moves
theoretical minimum no of moves
no of times the game is extended FIGS. 21A, 21B, and 21C illustrate examples of custom games to collect detailed data according to an embodiment. The game 1 Greater in FIG. 21A may operate by showing two "cards", each displaying a number or an equation. The numbers can be adaptively presented and its difficulty can be increased up to high school geometry. The player is asked to select which card is the greater value (or click on an "Equal" button if they are equal). The game displays increasingly difficult problems through [20] levels. A few parameters:

Player can complete 3 problems in a level to proceed to the next

A player has up to 1 minute to solve problems in levels 1-10 and 2 minutes for levels 11-20

Game may end when player has answered 5 incorrect questions

The system may need to randomly select a multitude of parameters to display the two cards, including:

Type of problem to display on each card (e.g., addition, area of an object, algebraic equation, etc.)

The numeric values used in the problem

The mathematic operator to be used in some of the problem types (e.g., parenthetical problems)

There are 11 problem types:
Addition
Subtraction
Multiplication
Division
Exponents
Circumference of squares, rectangles, circles
Circumference of triangles
Area of squares, rectangles, circles
Area of triangles
Volume
Parenthetical equations where each parenthesis could contain any of the problem categories above—e.g., $(342-125) \times (5^3-3^2)$ When the game is initiated, a "Level 0" is presented before score begins to be calculated to give the player a feel for the game. After completion, the game begins on Level 1. Upon completing 3 correct answers, system may display, "Congratulations on completing Level 1. Moving to Level 2." After completing Level 10, system can display "Congratulations on completing Level 10. Would you like to stop or continue on?" "Stop" and "Continue on" buttons can be displayed. If the player decides to continue on, system reset the "wrong problems" counter to zero and start counting wrong problems again. At the end of the game or when the player chooses to end the game, display "Congratulations!" and show the player's core in this game relative to the last 5 scores he/she had.

Points can be earned the following ways:
Correct answer: Each time a problem is answered correctly, point are awarded based on two components:
The level number is multiplied by 10 and that value is given to the player as "correct answer points" (e.g., correct answers in Level 1 yields 10 points. Correct answers in Level 20 yield 200 points).
A point is award for each second remaining as "time bonus points."
Level bonus: Each time a level is finished the number of that level is multiplied by 100 and those points are given (100 points are awarded upon completion of Level 1; 2,000 points for completing Level 20)
Consecutive correct answers bonus:
Answering 5 correct problems in a row results in 5× the points awarded for the last correct answer (e.g., if the last correct answer in the sequence of 5 earned 100 points, the 5-series bonus is 500)
Answering 10× correct problems in a row results in 10× the points awarded for the last correct answer Points can be deducted for answering incorrectly. Points equaling 5× the level number can be deducted for each incorrect response.

The following elements of Greater are captured and passed back to the API:
  Date/time stamp
  Level
  Successful (Yes/No)?
  Score
  Amount of time available
  Amount of time used
  % of available time used
  Problem type correctly answered most frequently from start of this game
  Problem type incorrectly answered most frequently from start of this game
The following items can be dumped to file outside of the API for each question posed to the player:
  UserID
  Date/time stamp
  Level
  Problem type
  Problem posed
  Answer given
  Correct answer (Yes/No)?
  Amount of time available
  Amount of time used The game 2 Motion in FIG. 21B may operate by showing pictures. The pictures can be adaptively presented and its difficulty can be increased up to 15 simultaneous frames to assess multitasking. The number of objects in each frame can be varied to assess logical reasoning and prioritization. The game 3 Berserk in FIG. 21C can combine Greater and Motion into one simultaneous game. The cards and pictures can be adaptively presented.

Figure 22:
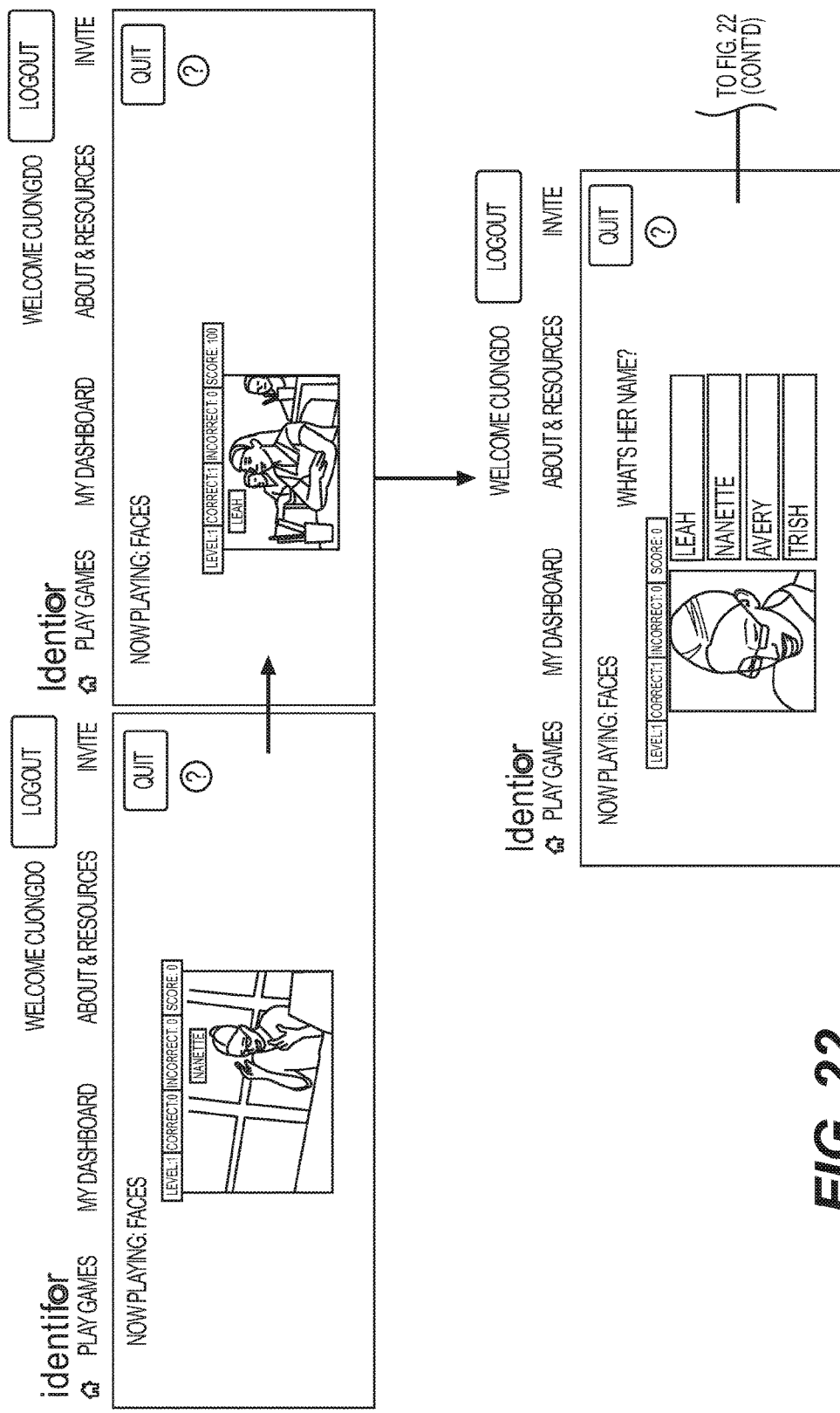
FIG. 22 illustrates an example flow of a custom game to collect detailed data using face recognition according to an embodiment.
Figure 22:
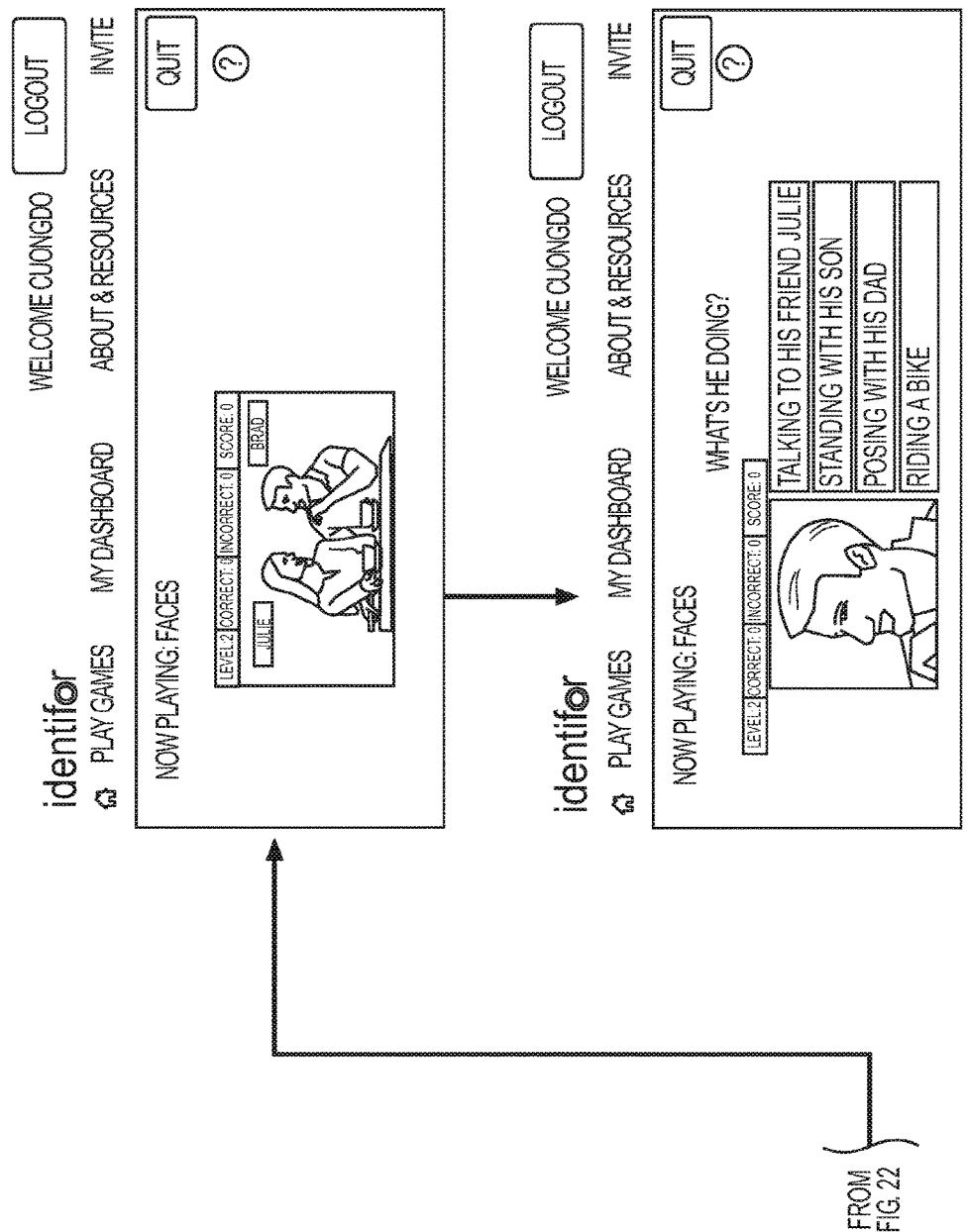

FIG. 22 illustrates an example flow of a custom game to collect detailed data using face recognition according to an embodiment. The game Faces can continue to adaptively present increasingly complex pictures of people engaged in various activities and asking questions. The questions asked can include:
  What is the color of Derek's guitar?
  How many faces were in the last picture?
  How many people were holding folder?
  How many yellow folders were held by the people?

When the Faces is initiated, at level 0, the player is presented with a 1-person picture. The individual can have 5 seconds to look at the picture and the name of the person in the picture. The three elements to focus on are: (1) the person's name; (2) what they are doing in the picture; and (3) questionable aspects such as color or pattern of clothing, what the person in the picture is holding, environment around the person, etc. After the picture is shown for the designated time, a picture adjusted to the individual's face can appear. At this point, the player can be asked either one of the following questions randomly selected by the system:
  What is the name of the individual in the picture shown? Sophia
  What is Sophia doing? Playing tennis
  What is Sophia holding? A tennis racquet
The system can give 4 choices for the player to select from.

Faces can work for a 4 person image. For example, a picture having four person can be displayed for a designated amount of time with the names "Marilyn, Jayden, Andy, Aubrie" listed respectively. The questions asked can include:
  What is the color of Marilyn's shoes? Red
  What is Jayden holding? A clipboard
  What is the color of Andy's folder? Purple
  What is her name? Aubrie At level 1, for one picture before quiz, the player can be presented with a picture randomly selected from among the 1-face images for 5 seconds. The system then quizzes the player by displaying a randomly select question about the picture just shown. If the player gets the answer wrong, they will be shown the correct answer with the full picture of the individual. The system then repeats step 1. If the player gets the answer correct, proceed to step 2.

For two pictures before quiz, the player can be shown a new image with 1 face for 5 seconds. The player can be shown another new image with 1 face for 5 seconds. The system quizzes the player randomly selecting one of the 3 possible quiz questions for the select image. If the player gets the answer wrong, repeat these two pictures before quiz step. If the player gets the answer correct, continue to next step.

The game can become increasingly difficult by showing three pictures before quiz and then four pictures before quiz. Once the player answers a question after 4 pictures, they will move up a level.

Level 2 and beyond can work the same way as Level 1, but the system can randomly select from images with 2 or more faces.
  Levels:
  Level 1: 1 face
  Level 2: 2 faces
  Level 3: 3 faces
  Level 4: 4 faces
  Level 5: 5 faces
  Level 6: 6 faces
  Level 7: 7 faces
  Level 8: 8 or more faces When quizzing the player, the system can select from any face shown up to that point. That is, even though the player may be in Level 3 (3-face images), the system can still select from a face shown during Level 1.

The player can be given points if they answer any of the following 3 questions correctly: (1) Name of the individual(s); (2) Their activity; and (3) Answer to the unique questions. The player can earn 100 points for 1-face images, 200 points for 2-face images, and 300 for 3-faces, etc. The points are not taken away for wrong answers. The Faces game ends upon player getting 20 correct answers or 5 incorrect answers.

At the end of each level, the system can use the API to record the following data elements:
  Date/time stamp
  Level
  Score
  # name questions presented
  # name questions answered correctly
  # activity questions presented
  # activity questions answered correctly
  # unique questions presented
  # unique questions answered correctly
  Maximum number of intervening images for a correct answer (i.e., how far back can the player remember a face)

Figure 23:
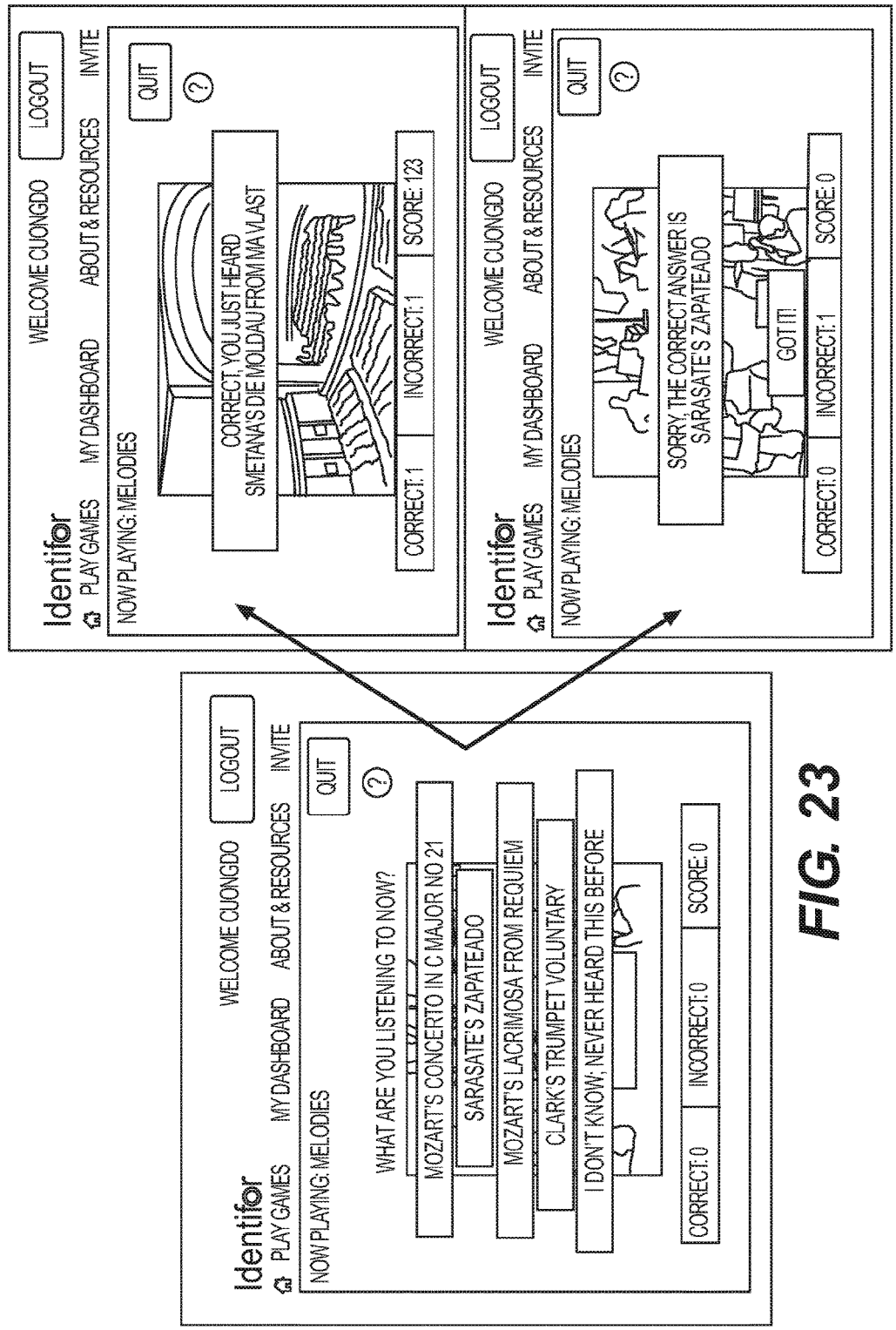
FIG. 23 illustrates another example flow of a custom game to collect detailed data using melody recognition according to an embodiment.

At the end of each level, the system can also use the API to record the following data elements:
  Date/time stamp
  Level
  Successful (Yes/No)?
  Score
  # Correct names
  # Correct male names
  # Correct male names % Correct names
% Correct male names
% Correct male names
correct activities
% correct activities
Max # of people in image where player answered name correctly
# of correct answers where there's 1 person in the image
# of correct answers where there's 2 people in the image
# of correct answers where there's 3 people in the image
# of correct answers where there's 4 people in the image
# of correct answers where there's 5 people in the image
# of correct answers where there's 6 people in the image
# of correct answers where there's 7 people in the image
# of correct answers where there's 8 or more people in the image
% of correct answers where there's 1 person in the image
% of correct answers where there's 2 people in the image
% of correct answers where there's 3 people in the image
% of correct answers where there's 4 people in the image
% of correct answers where there's 5 people in the image
% of correct answers where there's 6 people in the image
% of correct answers where there's 7 people in the image
% of correct answers where there's 8 or more people in the image FIG. 23 illustrates another example flow of a custom game to collect detailed data using melody recognition according to an embodiment. The game Melodies can test musical memory, not whether someone already knows a melody. As such, the real value from the game can come from understanding what happens after a player gets a melody wrong. Whether he/she is able to remember the name of the melody when we serve it up again. The fact that a player already knows a piece is helpful in increasing his score, but the real value of the game is its tracking of correct answers the first time it is played vs. when played the second or third or fourth time.

At level 0 practice round, on one screen, the system can displays a nice background, play a clip, and ask the player to choose from 4 possible options—3 of which are names musical pieces and the $5^{th}$ choice is "I don't know; never heard this before."

The system can play a clip randomly selected from among all possible pieces from our collection as well as from the "Previously Incorrect" list. The system randomly select only from the previously un-played collection for the first 4 clips. Thereafter, the system has 50% probability of choosing from un-played and 50% probability of choosing from "Previously incorrect" list. Once the player has correctly answered for a clip, that clip is not presented again.

The system can ask the player to choose from 4 possible options. If player provides the correct answer, the system notes the piece has been answered correctly, increase the # correct answers count by 1, increase the score and proceed to Step 1 again. If the player provides the wrong answer or does not know, the system: (1) plays the piece again with the correct name for the piece; (2) increases the "# wrong" counter for this piece by 1 and put piece in "Previously incorrect" queue of musical pieces to be chosen from again; (3) increases the # wrong for the game by 1; and (4) proceeds to Step 1 again.

As this game really doesn't have levels, it continues until the player reaches 10 incorrect answers or 20 correct answers. If the game ends by reaching the 10 incorrect answers constraint, the system displays "Game over. Would you like to try again?" If the game ends by reaching to 20 correct answers constrain, the system displays "Congratulations on getting 20 correct answers—you have great musical memory. Would you like to continue?" The system writes the data using the API. If player wants to continue, the system restarts the correct/incorrect counters and continue on until player reaches the next 10 incorrect/20 correct constrain.

At the end of the game or each "round", the system can write the following to the database via the API:
Date/time stamp
Score
pieces answered correctly the first time (i.e., player already knew the piece)
% of pieces answered correct on the $1^{st}$ presentation
pieces answered correct on the $2^{nd}$ presentation
% of pieces answered correct on the $2^{nd}$ presentation
pieces answered correct on the $3^{rd}$ or subsequent presentation (i.e., player learned the piece)
% of pieces answered correct on the $3^{rd}$ presentation
pieces answered incorrectly despite multiple presentations In addition, the system may keep track of the individual names/IDs for the pieces that player already knew, learned, and never learned. For every clip presented, the system can write to a file the a record that has the following items:
UserID
Date/time stamp
Music clip name/ID
Answer player provided
Whether player correctly answered (Yes/No)
If player answered correctly, how many presentations did it take for player to get correct ($1^{st}$ time, $2^{nd}$, $3^{rd}$, etc.)

Figure 24:
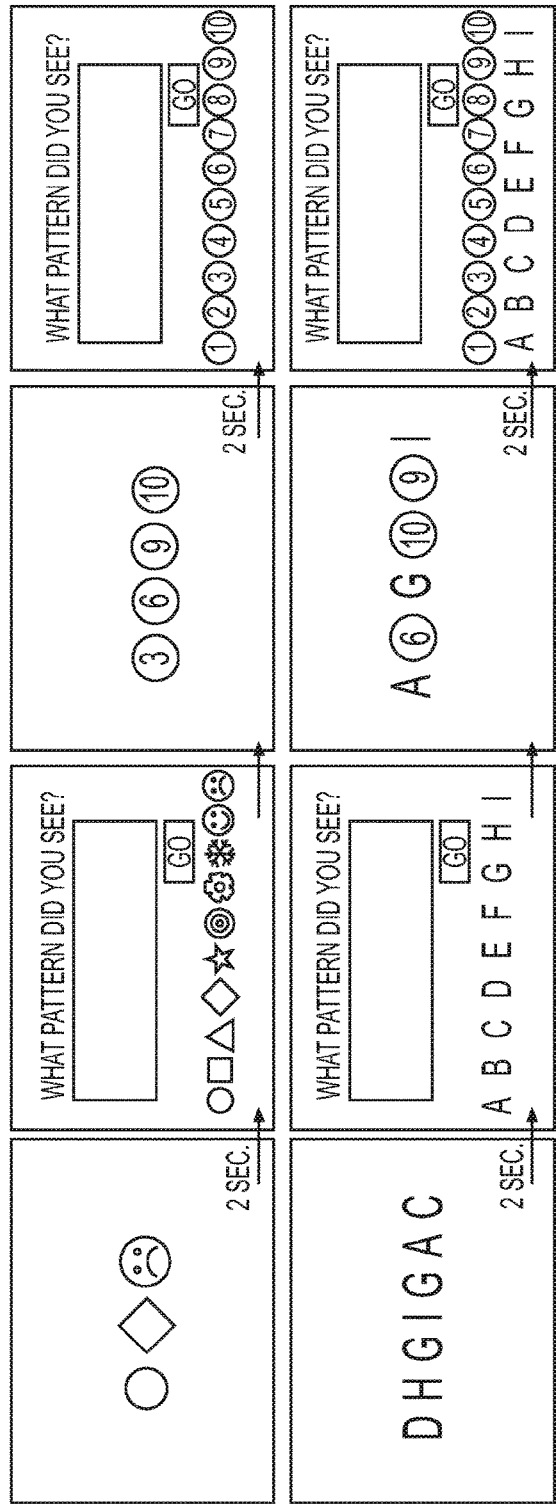
FIG. 24 illustrates another example flow of a custom game to collect detailed data using pattern recognition according to an embodiment.

At the end of the game or each "round", the system can also write the following to the database via the API:
Date/time stamp
Level
Successful (Yes/No)?
Score
# of melodies answered correct on $1^{st}$ hearing (i.e., already know the tune)
# of melodies answered correct on $2^{nd}$ hearing
# of melodies answered correct on $3^{rd}$ hearing
# of melodies answered correct on $4^{th}$ hearing
% of melodies answered correct on $1^{st}$ hearing (i.e., already know the tune)
% of melodies answered correct on $2^{nd}$ hearing
% of melodies answered correct on $3^{rd}$ hearing
% of melodies answered correct on 4th hearing
% classical clips answered correctly
% jazz clips answered correctly
% pop music clip answered correctly
% classic rock clips answered correctly
% country clips answered correctly
% children clips answered correctly FIG. 24 illustrates another example flow of a custom game to collect detailed data using pattern recognition according to an embodiment. As illustrated in FIG. 24, the game Patterns can continue to adaptively present increasingly complex patterns, mixing from the shapes, numbers, and letters palettes.

Figure 25A:
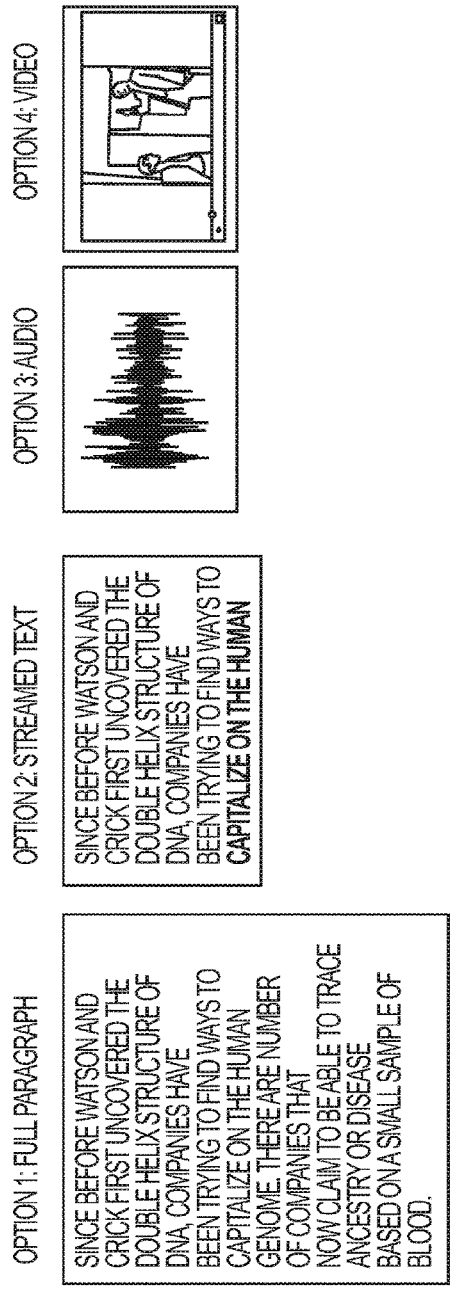
FIG. 25 illustrates another example of a custom game to collect detailed data with different comprehension mode according to an embodiment.

FIG. 25 illustrates another example of a custom game to collect detailed data with different comprehension mode according to an embodiment. Most autistic students do poorly on reading comprehension test, yet source of failure is unclear. The possible cause of failure can be that: (1) they cannot receive information due to sensory overload from a paragraph of text; (2) they cannot comprehend information received; or (3) they cannot provide answer due to motor challenges. As described in FIG. 25, offering different comprehension mode can isolate factors that can interfere with comprehension to the autistic students. For example, adaptive, random presentation of different presentation options over a battery of questions can isolate respondent's preferred interaction mode.

FIG. 26 illustrates other examples of custom games (Arrows, Math Bubbles, Bumpers) to collect detailed data according to an embodiment. The game Arrows can primarily measure focus whether the player is able to focus despite distractions. At the end of the game or each "round", the system can write the following to the database via the API:
- Date/time stamp
- Level
- Successful (Yes/No)?
- Score
- # correct answers against the pack (i.e. when the bird of focus is flying in a different direction as the rest of the pack)
- # correct answers with the pack
- % time correct when against the pack—this is perhaps the single most revealing metric of focus
- % time correct when with the pack
- Average speed to answer
- Average speed to answer correctly—against the pack
- Average speed to answer correctly—with the pack
- Average speed to answer incorrectly—against the pack
- Average speed to answer incorrectly—with the pack The primary purpose of the game Bumpers is logical process (visual recall of the bumpers is secondary). At the end of the game or each "round", the system can write the following to the database via the API:
- Date/time stamp
- Level
- Successful (Yes/No)?
- Score
- Grid size (number of cells)
- # correct tries
- # incorrect tries
- Max # paddles shown in a turn in the level
- Max # paddles touched in a turn in the level
- Shortest time taken to answer
- Longest time taken to answer
- Total # paddles touched for all the correct answers for all turns in the level # times hint used The game Math Bubbles can primarily measure logic-arithmetic. The arithmetic problems can be generated based on the following table:

The greater number generated is always first in the presented equation. For division the greater random generated number is the numerator and the lesser is the denominator. The answer to all questions can be a whole number.

The player starts at level one. To proceed to the next level, the player may accurately answer five questions in a row. If a question is answered incorrectly, the level is started over. The operation of the question is randomly selected from the available options for that level. Then the two numbers are randomly generated as per the ranges listed above. Once the maximum level is finished regardless of future failures, the player can receive Level 15 difficulty questions until they fail or decide to quit. For every 50 questions answered correctly, the player is presented with a screen saying "Congrats! You have answered 50 questions correctly! You can choose to quit now with your current score or can opt to continue and answer another 50 questions from where you left off." The player can here click whether they wish to continue or stop.

In Math Bubbles, there are four aspects to scoring: (1) Difficulty of Problem; (2) Velocity of Bubbles; (3) Density of Bubbles on screen; and (4) Time taken to answer. The difficulty score of the problem is the level of the problem× 10. For example, answering a level 6 question correctly is worth 60 points.

There are three possible velocities of the bubbles: 1× speed, 1.5× speed, and 2× speed. The speed multiplier is multiplied with the difficulty score of the problem. If the level 6 questions were answered correctly on 1.5× speed, answering the question is now worth 1.5×60 or 90 points. The slow bubble can take 12 seconds to reach the bottom of the screen. The medium speed bubbles can take 8 seconds to reach the bottom of the screen, and the fast bubbles can take 6 seconds to reach the bottom of the screen The density of the bubbles is decided by how much time is allowed between bubble releases. The base release rate (slow) is one per 12 seconds with a 1× multiplier. The medium release rate is one per 9 seconds with a 6× multiplier. The fast release rate is one per 4.5 seconds with a 2× multiplier. If the bubble from before released at medium speed on level 6 is released after 6 seconds (1.5× multiplier) the score is then 90×1.5=135.

The time taken to answer is the last factor in scoring. If the bubble is correctly answered in the top ⅓ of the screen a 2× multiplier is applied. If the bubble is answered in the middle ⅓ of the screen a 1.5× multiplier is awarded. If the bubble is answered in the last ⅓ of the screen a 1× multiplier is awarded. This is multiplied at the end to the existing score. If using the same bubble as before is answered in the middle

|  | Addition | Subtraction | Multiplication | Division |
|---|---|---|---|---|
| Level 1: | [0 ... 5] + [0 ... 5] | | | |
| Level 2: | [0 ... 10] + [0 ... 10] | [0 ... 5] − [0 ... 5] | | |
| Level 3: | [0 ... 20] + [0 ... 20] | [0 ... 10] − [0 ... 10] | | |
| Level 4: | [10 ... 25] + [10 ... 25] | [0 ... 20] − [0 ... 20] | [0 ... 5] × [0 ... 5] | [0 ... 10]/[0 ... 10] |
| Level 5: | [20 ... 50] + [25 ... 50] | [10 ... 25] − [10 ... 25] | [0 ... 10] × [0 ... 10] | [0 ... 20]/[0 ... 20] |
| Level 6: | [35 ... 75] + [35 ... 75] | [20 ... 50] − [25 ... 50] | [5 ... 11] × [5 ... 11] | [0 ... 30]/[0 ... 30] |
| Level 7: | [50 ... 100] + [50 ... 100] | [35 ... 75] − [35 ... 75] | [5 ... 13] × [5 ... 13] | [0 ... 40]/[0 ... 40] |
| Level 8: | [75 ... 125] + [75 ... 125] | [50 ... 100] − [50 ... 100] | [5 ... 15] × [5 ... 15] | [0 ... 50]/[0 ... 50] |
| Level 9: | [100 ... 150] + [100 ... 150] | [50 ... 125] − [50 ... 125] | [7 ... 17] × [7 ... 17] | [10 ... 75]/[10 ... 75] |
| Level 10: | [125 ... 200] + [125 ... 200] | [50 ... 150] − [50 ... 150] | [7 ... 19] × [7 ... 19] | [10 ... 100]/[10 ... 100] |
| Level 11: | [175 ... 250] + [175 ... 250] | [50 ... 200] − [50 ... 200] | [9 ... 20] × [9 ... 20] | [5 ... 75]/[5 ... 75] |
| Level 12: | [225 ... 275] + [225 ... 275] | [50 ... 250] − [50 ... 250] | [10 ... 21] × [10 ... 21] | [5 ... 100]/[5 ... 100] |
| Level 13: | [275 ... 350] + [275 ... 350] | [50 ... 300] − [50 ... 300] | [10 ... 22] × [10 ... 22] | [5 ... 125]/[5 ... 125] |
| Level 14: | [350 ... 425] + [350 ... 425] | [50 ... 400] − [50 ... 400] | [10 ... 23] × [10 ... 23] | [5 ... 150]/[5 ... 150] |
| Level 15: | [425 ... 500] + [425 ... 500] | [50 ... 500] − [50 ... 500] | [10 ... 25] × [10 ... 25] | [0 ... 200]/[0 ... 200] |

⅓ of the screen, then the final score is 135×1.5=202.5 which will be rounded up to the nearest whole number, in this case 203.

The equation for score is:

(Level of Problem×10)×(VelocityMultiplier)×(Rate-Multiplier)×(TimeToAnswerMultiplier)

The starting velocity is 1× speed and the starting release rate is one per 8 seconds. For every 15 problems answered correctly both velocity and release rate are increased one stage until the 3 level (fast) is released. If a player answers a problem incorrectly, the level of speed and velocity are moved down one level. For example, if a player has answered 32 questions correctly in a row (and is thus on a 2× multiplier for both speed and rate of release) and the 33$^{rd}$ question is answered incorrectly, the velocity and rate of release are moved down to 1.5× until 15 questions are answered correctly in a row again.

At the end of the game or each "round", the system can write the following to the database via the API:
Date/time stamp
Level
Successful (Yes/No)?
Score
problems solved correctly
addition problems solved correctly
subtraction problems solved correctly
multiplication problems solved correctly
division problems solved correctly
problems missed/incorrect
Value of largest "top number"—the first number presented in the equation
Value of largest "bottom number"—the second number presented in the equation
Value of largest "answer"
Max number of problems on the screen at one time.

Figure 27:
FIG. 27 illustrates examples of tailored games to assess ability area according to an embodiment.

FIG. 27 illustrates examples of tailored games to assess ability area according to an embodiment. These tailored games can assess difficult ability areas such as bodily-kinesthetic. This type of games can be created from existing Xbox games using Kinect's camera to assess bodily movement abilities.

Figure 28A:
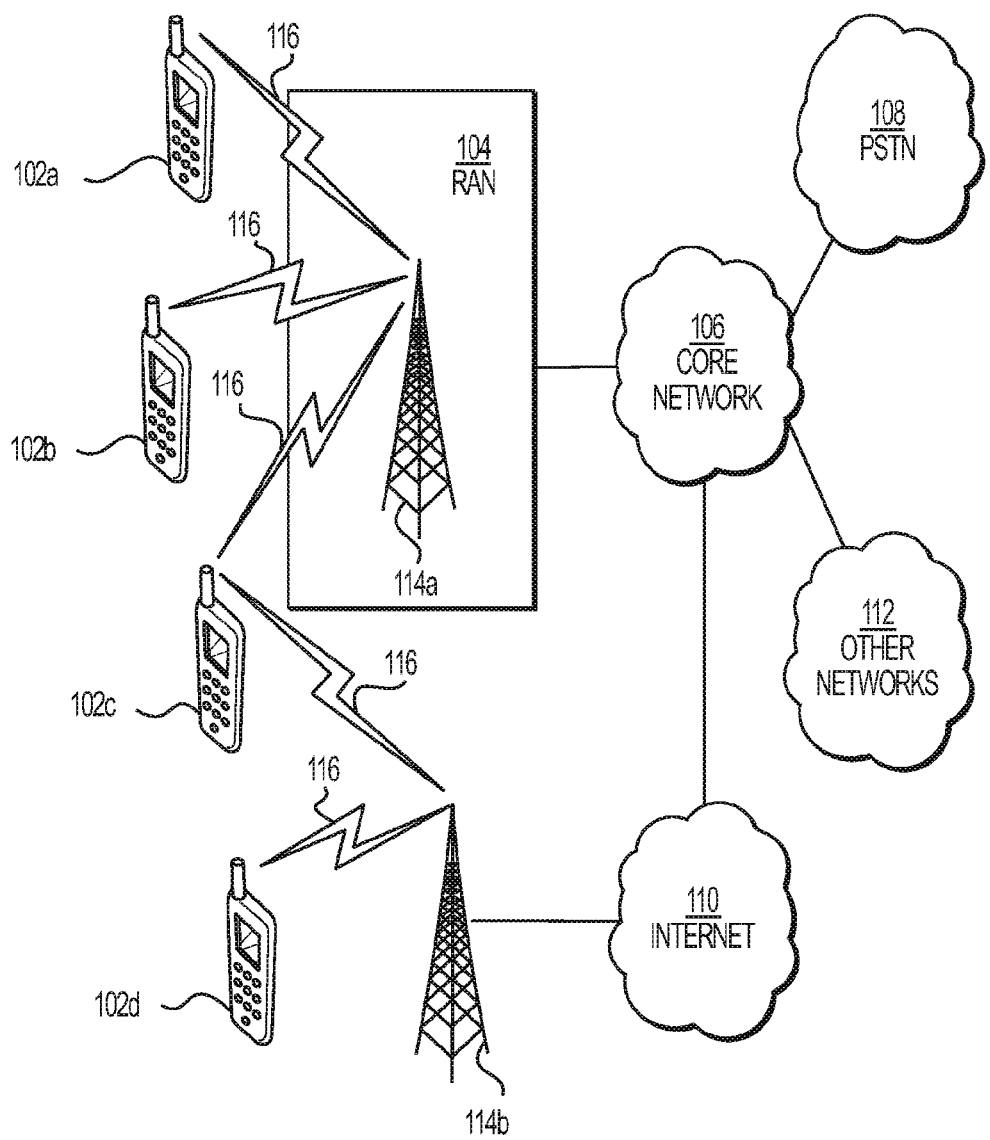
FIG. 28A is a system diagram of an example communications system in which one or more disclosed embodiments can be implemented.

FIG. 28A is a diagram of an example communications system 100 in which one or more disclosed embodiments may be implemented. The communications system 100 may be a multiple access system that provides content, such as voice, data, video, messaging, broadcast, game etc., to multiple wireless users and game players. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 28A may also be referred to herein as a network.

As shown in FIG. 28A, the communications system 100 may include wireless transmit/receive units (WTRUs) 102 a, 102b, 102 c, 102 d, a radio access network (RAN) 104, a core network 106, a public switched telephone network (PSTN)108, the Internet 110, and other networks 112, though it will be appreciated that the disclosed embodiments contemplate any number of WTRUs, base stations, networks, and/or network elements. Each of the WTRUs 102 a, 102 b, 102 c, 102d may be any type of device configured to operate and/or communicate in a wireless environment. By way of example, the WTRUs 102 a, 102 b, 102 c, 102 d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, tables, multimedia console games, and the like.

The communications systems 100 may also include a base station 114 a and a base station 114 b. Each of the base stations 114 a, 114 b may be any type of device configured to wirelessly interface with at least one of the WTRUs 102 a,102 b, 102 c, 102 d to facilitate access to one or more communication networks, such as the core network 106, the Internet 110, and/or the networks 112. By way of example, the base stations 114 a, 114 b may be a base transceiver station (BTS), a Node-B, an eNode B, a Home Node B, a Home eNode B, a site controller, an access point (AP), a wireless router, and the like. While the base stations 114 a, 114 b are each depicted as a single element, it will be appreciated that the base stations 114 a, 114 b may include any number of interconnected base stations and/or network elements.

The base station 114 a may be part of the RAN 104, which may also include other base stations and/or network elements (not shown), such as a base station controller (BSC), a radio network controller (RNC), relay nodes, etc. The base station 114 a and/or the base station 114 b may be configured to transmit and/or receive wireless signals within a particular geographic region, which may be referred to as a cell (not shown). The cell may further be divided into cell sectors. For example, the cell associated with the base station 114 a may be divided into three sectors. Thus, in an embodiment, the base station 114 a may include three transceivers, i.e., one for each sector of the cell. In another embodiment, the base station 114 a may employ multiple-input multiple output (MIMO) technology and, therefore, may utilize multiple transceivers for each sector of the cell.

The base stations 114 a, 114 b may communicate with one or more of the WTRUs 102 a, 102 b, 102 c, 102 d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114 a in the RAN 104 and the WTRUs 102 a, 102 b, 102 c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114 a and the WTRUs 102 a, 102 b, 102 c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114 *a* and the WTRUs 102 *a*, 102 *b*, 102 *c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114 *b* in FIG. 28A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114 *b* and the WTRUs 102 *c*, 102 *d* may implement a radio technology such as IEEE 802.11 to establish a wireless local area network (WLAN). In another embodiment, the base station 114 *b* and the WTRUs 102 *c*, 102 *d* may implement a radio technology such as IEEE 802.15 to establish a wireless personal area network (WPAN). In yet another embodiment, the base station 114 *b* and the WTRUs 102 *c*, 102 *d* may utilize a cellular-based RAT (e.g., WCDMA, CDMA2000, GSM, LTE, LTE-A, etc.) to establish a picocell or femtocell. As shown in FIG. 28A, the base station 114 *b* may have a direct connection to the Internet 110. Thus, the base station 114 *b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102 *a*, 102 *b*, 102 *c*, 102 *d*. For example, the core network 106 may provide call control, billing services, mobile location-based services, pre-paid calling, Internet connectivity, video distribution, etc., and/or perform high-level security functions, such as user authentication. Although not shown in FIG. 28A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102 *a*, 102 *b*, 102 *c*, 102 *d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102 *a*, 102 *b*, 102 *c*, 102 *d* in the communications system 100 may include multi-mode capabilities, i.e., the WTRUs 102 *a*, 102 *b*, 102 *c*, 102 *d* may include multiple transceivers for communicating with different wireless networks over different wireless links. For example, the WTRU 102 *c* shown in FIG. 28A may be configured to communicate with the base station 114 *a*, which may employ a cellular-based radio technology, and with the base station 114 *b*, which may employ an IEEE 802 radio technology.

Figure 28B:
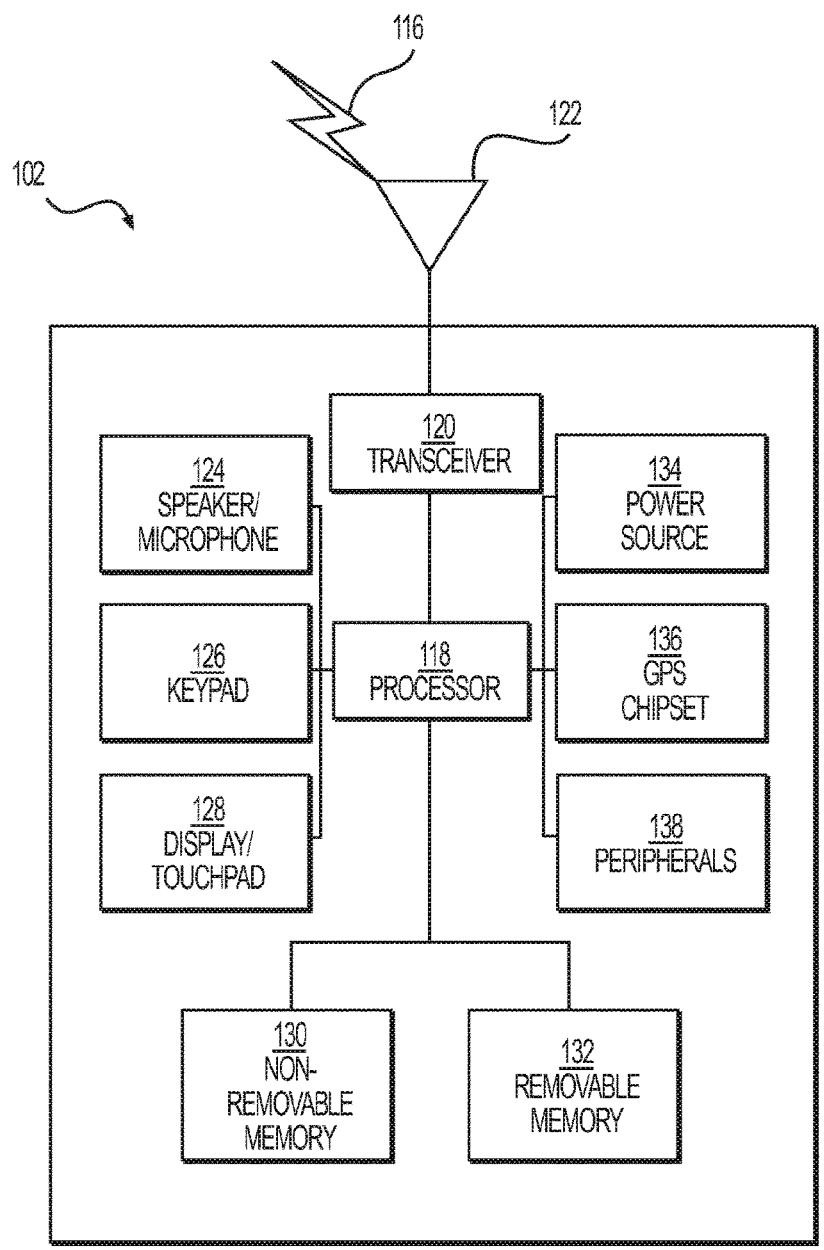
FIG. 28B is a system diagram of an example device that can implement a game and be used within the communications system illustrated in FIG. 28A.

FIG. 28B is a system diagram of an example WTRU 102. As shown in FIG. 28B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 28B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114 *a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 28B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114 *a*, 114 *b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 29:
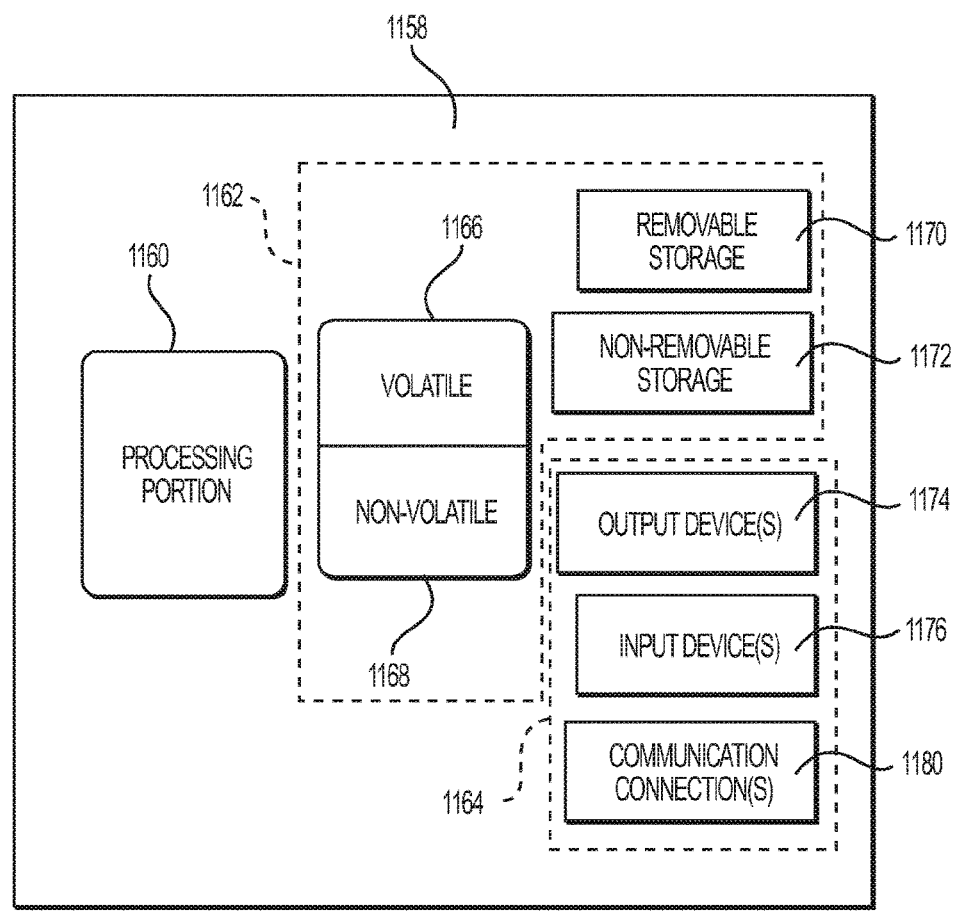
FIG. 29 is a block diagram of an example processor in which identification of an individual's abilities, skills and interests may be implemented.

FIG. 29 is a block diagram of an example processor 1158 which may be employed in any of the embodiments described herein, including as one or more components of mobile devices 210, 310, and 610, as one or more components of network equipment or related equipment, and/or as one or more components of any third party system or subsystem that may implement any portion of the subject matter described herein. It is emphasized that the block diagram depicted in FIG. 29 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 29, the processor 1158 comprises a processing portion 1160, a memory portion 1162, and an input/output portion 1164. The processing portion 1160, memory portion 1162, and input/output portion 1164 are coupled together (coupling not shown in FIG. 10) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive data access request data and responses, transmit, receive, store and process text, data, and voice communications, execute software that efficiently processes radio resource requests, receive and store radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, radio resource requests, software for an efficient radio resource request processing system, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s)1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

While example embodiments of systems and methods to identify an individual's abilities, skills and interests have been described in connection with various communications devices and computing devices/processors, the underlying concepts can be applied to any communications or computing device, processor, or system capable of implementing the systems and methods to identify an individual's abilities, skills and interests. The various techniques described herein may be implemented in connection with hardware or software or, where appropriate, with a combination of both. Thus, the systems and methods to identify an individual's abilities, skills and interests, or certain aspects or portions thereof, can take the form of program code (i.e., instructions) embodied in tangible, non-transitory media, such as floppy diskettes, CD-ROMs, hard drives, or any other machine-readable storage medium, wherein, when the program code is loaded into and executed by a machine, such as a computer, the machine becomes an apparatus for identifying an individual's abilities, skills and interests. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

It is to be understood that a storage medium, memory, a computer-readable storage medium, and a machine readable storage medium, as described herein have a concrete, tangible, physical structure. As is known, a signal does not have a concrete, tangible, physical structure. A storage medium, memory, a computer-readable storage medium, and a machine readable storage medium, as well as any computer-readable storage medium described herein, is not to be construed as a signal. A storage medium, memory, a computer-readable storage medium, and a machine readable storage medium, as well as any computer-readable storage medium described herein, is not to be construed as a transient signal. A storage medium, memory, a computer-readable storage medium, and a machine readable storage medium, as well as any computer-readable storage medium described herein, is not to be construed as a propagating signal. A storage medium, memory, a computer-readable storage medium, and a machine readable storage medium, as well as any computer-readable storage medium described herein, is to be construed as an article of manufacture having a concrete, physical, tangible structure.

Methods and systems for identifying an individual's abilities, skills and interests may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for identifying an individual's abilities, skills and interests. When implemented on a general-purpose processor, the program code combines with the processor to provide a unique apparatus that operates to invoke the functionality of identifying an individual's abilities, skills and interests as described herein. Additionally, any storage techniques used in connection with an intelligent roaming and interworking system may invariably be a combination of hardware and software.

While systems and methods for identifying an individual's abilities, skills and interests have been described in connection with the various embodiments of the various figures, it is to be understood that other similar embodiments may be used or modifications and additions may be made to the described embodiments for performing the same function of identifying an individual's abilities, skills and interests without deviating therefrom. For example, one skilled in the art will recognize that systems and methods for identifying an individual's abilities, skills and interests as described in the present application may apply to any environment, whether wired or wireless, and may be applied to any number of such devices connected via a communications network and interacting across the network. Therefore, systems and methods for identifying an individual's abilities, skills and interests should not be limited to any single embodiment, but rather should be construed in breadth and scope in accordance with the appended claims.

What is claimed:

1. A method comprising:
    receiving, at a server, game data indicative of a plurality of games, each game of the plurality of games designed to be played with assistance from an artificial intelligence platform and assess, using a standardized model, at least one personal characteristic, wherein the assistance from the artificial intelligence platform includes coaching, educating, monitoring, reminding, or any combination thereof;
    determining, by the server, a first comparative game performance associated with a first game of the plurality of games, the first comparative game performance being based on the game data and comparative game information, the comparative game information being indicative of a comparison between game performance associated with the first game and respective game performance associated with at least one other game of the plurality of games;
    deriving, by the server, using the standardized model, the personal characteristic assessed by the first game from the first comparative game performance; and
    providing, by the server, an indication of the personal characteristic.

2. The method of claim 1, wherein the at least one personal characteristic comprises at least one of human abilities, cognitive skills, or career interests.

3. The method of claim 2, wherein the human abilities comprise math skills, logical reasoning skills, linguistic skills, visual-spatial skills, musical skills, bodily-kinesthetic skills, interpersonal skills, intrapersonal skills, and naturalistic skills.

4. The method of claim 2, wherein the cognitive skills comprise attention functions, engagement functions, optimization functions, efficiency functions, memory functions, inquiry functions, and solution functions.

5. The method of claim 1, wherein the artificial intelligence platform uses an avatar as a user interface.

6. The method of claim 5 wherein the avatar uses natural language and speech recognition to engage a user.

7. A system comprising:
    a processor; and
    memory coupled to the processor, the memory comprising at least one executable instruction that when executed by the processor causes the processor to effectuate operations comprising:
        receiving game data indicative of a plurality of games, each game of the plurality of games designed to be played with assistance from an artificial intelligence platform and assess, using a standardized model, at least one personal characteristic, wherein the assistance from the artificial intelligence platform includes coaching, educating, monitoring, reminding, or any combination thereof;

determining a first comparative game performance associated with a first game of the plurality of games, the first comparative game performance being based on the game data and comparative game information, the comparative game information being indicative of a comparison between game performance associated with the first game and respective game performance associated with at least one other game of the plurality of games;

deriving, using the standardized model, the personal characteristic assessed by the first game from the first comparative game performance; and providing an indication of the personal characteristic.

8. The system of claim 7, wherein the at least one personal characteristic comprises at least one of human abilities, cognitive skills, or career interests.

9. The system of claim 8, wherein the human abilities comprise math skills, logical reasoning skills, linguistic skills, visual-spatial skills, musical skills, bodily-kinesthetic skills, interpersonal skills, intrapersonal skills, and naturalistic skills.

10. The system of claim 8, wherein the cognitive skills comprise attention functions, engagement functions, optimization functions, efficiency functions, memory functions, inquiry functions, and solution functions.

11. The system of claim 7, wherein the artificial intelligence platform uses an avatar as a user interface, wherein the avatar uses natural language and speech recognition to engage a user.

12. A non-transitory computer readable storage medium comprising executable instructions, that when executed by a processor cause the processor to effectuate operations comprising:

receiving game data indicative of a plurality of games, each game of the plurality of games designed to be played with assistance from an artificial intelligence platform and assess, using a standardized model, at least one personal characteristic, wherein the assistance from the artificial intelligence platform includes coaching, educating, monitoring, reminding, or any combination thereof;

determining a first comparative game performance associated with a first game of the plurality of games, the first comparative game performance being based on the game data and comparative game information, the comparative game information being indicative of a comparison between game performance associated with the first game and respective game performance associated with at least one other game of the plurality of games;

deriving, using the standardized model, the personal characteristic assessed by the first game from the first comparative game performance; and providing an indication of the personal characteristic.

13. The computer-readable storage medium of claim 12, wherein the at least one personal characteristic comprises at least one of human abilities, cognitive skills, or career interests.

14. The computer-readable storage medium of claim 13, wherein the human abilities comprise math skills, logical reasoning skills, linguistic skills, visual-spatial skills, musical skills, bodily-kinesthetic skills, interpersonal skills, intrapersonal skills, and naturalistic skills.

15. The computer-readable storage medium of claim 13, wherein the cognitive skills comprise attention functions, engagement functions, optimization functions, efficiency functions, memory functions, inquiry functions, and solution functions.

16. The computer-readable storage medium of claim 12, wherein the artificial intelligence platform uses an avatar as a user interface, wherein the avatar uses natural language and speech recognition to engage a user.

* * * * *